(12) United States Patent
Uhlik et al.

(10) Patent No.: US 7,978,673 B1
(45) Date of Patent: Jul. 12, 2011

(54) CHANNEL ALLOCATION BASED ON RANDOM PLUS PLANNED PROCESSES

(75) Inventors: Christopher Richard Uhlik, Danville, CA (US); Douglas Dahlby, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 2808 days.

(21) Appl. No.: 09/753,266

(22) Filed: Dec. 29, 2000

(51) Int. Cl.
*H04W 4/00* (2009.01)

(52) U.S. Cl. ........................................................ 370/341

(58) Field of Classification Search .................. 455/509, 455/408, 404, 450, 404.1, 406, 33.1, 67.1, 455/54.1; 370/310, 329, 203, 252, 335, 341, 370/458; 342/174, 378; 702/179; 709/219, 709/318; 375/132; 705/27; 379/59
See application file for complete search history.

(56) References Cited

U.S. PATENT DOCUMENTS

| | | | |
|---|---|---|---|
| 5,345,596 A * | 9/1994 | Buchenhorner et al. | 455/450 |
| 5,642,353 A | 6/1997 | Roy, III et al. | |
| 5,680,398 A * | 10/1997 | Robinson | 370/458 |
| 5,687,171 A * | 11/1997 | Shin et al. | 370/335 |
| 5,828,658 A | 10/1998 | Ottersten et al. | |
| 5,886,988 A | 3/1999 | Yun et al. | |
| 6,006,084 A * | 12/1999 | Miller et al. | 455/406 |
| 6,037,898 A | 3/2000 | Parish et al. | |
| 6,188,910 B1 * | 2/2001 | Park et al. | 455/509 |
| 6,298,081 B1 * | 10/2001 | Almgren et al. | 375/132 |
| 6,466,795 B1 * | 10/2002 | Ahn | 455/450 |
| 6,633,754 B1 * | 10/2003 | Raith | 455/404.1 |
| 6,795,409 B1 * | 9/2004 | Youssefmir et al. | 370/328 |
| 6,810,258 B1 * | 10/2004 | Vialen | 455/450 |
| 2001/0027483 A1 * | 10/2001 | Gupta et al. | 709/219 |
| 2002/0044564 A1 * | 4/2002 | Ranta | 370/436 |
| 2002/0065081 A1 * | 5/2002 | Barany et al. | 455/450 |
| 2002/0072348 A1 * | 6/2002 | Wheeler et al. | 455/404 |
| 2002/0087740 A1 * | 7/2002 | Castanho et al. | 709/318 |
| 2003/0133426 A1 * | 7/2003 | Schein et al. | 370/337 |
| 2003/0163393 A1 * | 8/2003 | Mittal et al. | 705/27 |

* cited by examiner

*Primary Examiner* — Melody Mehrpour
(74) *Attorney, Agent, or Firm* — Blakely, Sokoloff, Taylor & Zafman LLP

(57) ABSTRACT

Wireless communication traffic channels are allocated based on random plus planned processes. A request for a traffic channel is sent on a random traffic channel that is not a dedicated random access channel. A determination is made whether to allocate a traffic channel based on status of a subscriber that sere the traffic channel request, including determining base on temps of subscription of the subscriber. An implementation at a base station includes receiving the request on a traffic channel making the determination, and assigning either the traffic channel on which the request was received, or another channel. In a user terminal, the user terminal sends the request on a random traffic channel that it is not assigned to, and receives a traffic channel allocation, or an indication that no channel is available.

55 Claims, 16 Drawing Sheets

FIG. 1B

| | BASE STATION | | REMOTE TERMINAL |
|---|---|---|---|
| 300 | ACQUIRE GPS TIMING | | |
| 302 | DETERMINE BCH SLOT TIME | | |
| 304 | | BCH ⇒ | |
| 306 | | | SCAN BCH CHANNELS |
| 308 | | | ACQUIRE FRAME TIMING |
| 310 | | | ACQUIRE SYNCHRONIZATION |
| 312 | | | BUILD MAP OF BASE STATIONS BCHS AND BSCCS |
| 314 | | | SELECT BASE STATION |
| 316 | | | BUILD CR USING UTID AND TRANSMIT POWER |
| 318 | | | SCAMBLE CR USING BSCC |
| 320 | | ⇐ CONFIGURATION REQUEST | |
| 322 | UNSCAMBLE CR USING BSCC | | |
| 324 | DETERMINE SPATIAL SIGNATURE OF REMOTE CR | | |
| 326 | | CONFIGURATION ⇒ MESSAGE | |
| 328 | | | ADJUST TIMING AND POWER |
| 330 | | ⇐ TRAFFIC REQUEST | |
| 332 | | TRAFFIC ASSIGNMENT ⇒ | |
| 334 | | ⇐ TRAFFIC ⇒ | |
| 336 | | SEND PACKET ⇒ | |
| 338 | | ⇐ SEND DA AND PACKET | |
| 340 | | SEND DA AND PACKET ⇒ | |
| 342 | | ⇐ SEND DA AND PACKET | |

FIG. 17

CHANNEL ALLOCATION BASED ON RANDOM PLUS PLANNED PROCESSES

BACKGROUND OF THE INVENTION

1. Field of the Invention

The invention generally relates to networks and more specifically relates to accessing networks.

2. Description of the Related Art

In general, access to communication systems has followed one of two patterns. Either the system allowed completely planned access, utilizing a control channel and other channels assigned through the control channel (traditional cellular systems for example) or the system allowed unplanned access, such as listening for space/time on a network and then squeezing packets into the space/time available (such as a traditional Ethernet/token ring for example). It will be appreciated that each of these styles of access either suffers from high overhead (a dedicated control channel) or potentially high latency (a situation where no space/time for packets is available). In either instance, the lack of availability of the full network resources on a priority basis can degrade performance of the network.

SUMMARY OF THE INVENTION

A method and apparatus for allocating channels using random plus planned processes is presented.

In one embodiment, the invention is a method of operating a base station. In one embodiment, this includes receiving a request for a first channel, determining whether a channel is available, and communicating to the requestor the channel availability. This may further include denying the request, assigning the first channel or assigning a second channel. This may further include receiving a request for a third or fourth channel upon granting of the first channel. This may also include determining whether a third or fourth channel is available, and communicating to the requestor the third channel availability or fourth channel availability.

In an alternate embodiment, the invention is a method of operating a user terminal. In one embodiment, this includes sending a request for a first channel; and receiving an indication of availability of a channel. This may further include the indication signaling no channel is available. This may also include waiting an inter-channel delay, sending a request for a third channel, and receiving an indication of availability of a channel. Additionally, this may include the indication signaling the third channel is not available, determining no other channels may be requested, waiting an inter-attempt delay, and sending a request for the first channel.

BRIEF DESCRIPTION OF THE DRAWINGS

The present invention is illustrated by way of example and not limitation in the accompanying figures.

FIG. 1B illustrates an embodiment of a grid of channels.

FIG. 17 is a diagram illustrating a communications sequence according to one embodiment of the present invention.

DETAILED DESCRIPTION

Figure 1A:
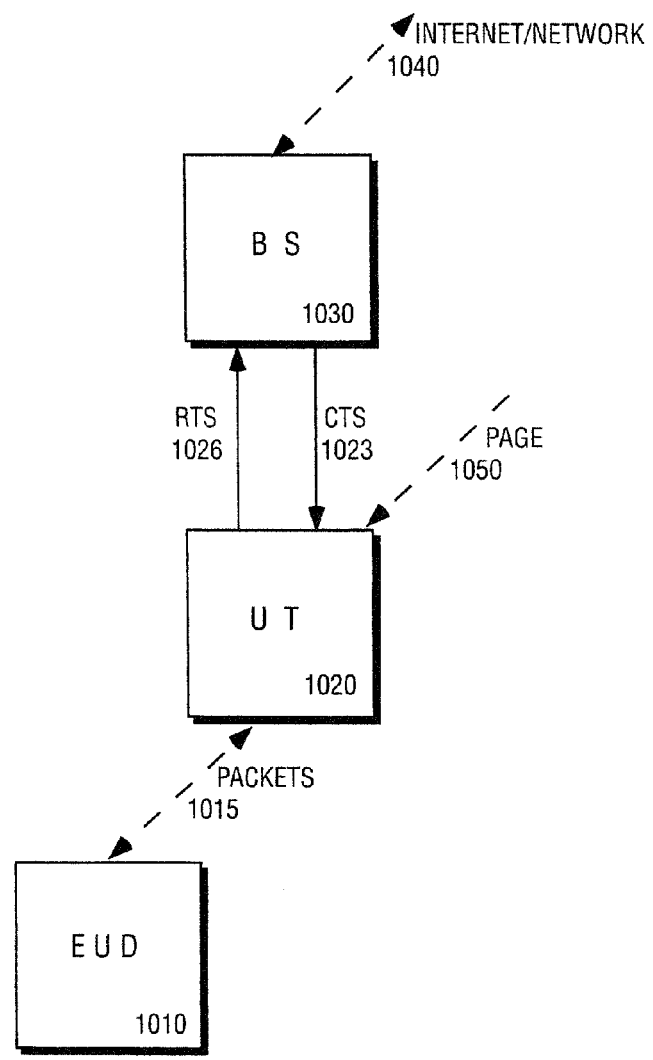
FIG. 1A illustrates communications between an embodiment of a base station and an embodiment of a user terminal.

A method and apparatus for channel allocation based on random plus planned processes is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

In one embodiment, random and planned processes are used to allocate the channels. Initially, a random event causes a request for a channel. This event may be a page signal which causes a subscriber device to connect to a network and download information associated with the page. This event may also be a subscriber attempting to initiate a call on a cellular phone or initiate a transmission from a two-way pager. This event may also be the network attempting to reach a subscriber to connect an incoming call to the subscriber's cellular telephone. It will be appreciated that many other random events may result in similar connections to various types of networks.

After this random event occurs, the planned processes take over. The planned processes may evaluate the network load, the status of the subscriber, whether the connection is an emergency connection, subscriber equipment, and other factors contributing to whether network resources should be made available. It will be appreciated by those skilled in the art that the exact implementation of these planned processes may vary widely within the spirit of the invention.

In an alternate embodiment, quality of service is based on probabilistic prioritization. Subscribers may pay at a first rate to gain access to the system for a first percentage of the time the subscriber is likely to request access. Subscribers may pay at a second rate to gain access to the system for a second percentage of the time the subscriber is likely to request access. This type of access may be granted based on a prioritization of requests as they are received, with higher priority requests getting first preference for access to resources, and greater allocations of available resources. Thus, a business user of a cellular phone may pay a first rate to achieve 95% likelihood of success in connecting to the network. A casual user of a cellular phone may pay a second rate to achieve 80% likelihood of success in connecting to the network. The casual user has less need to connect on any given attempt, and may experience significantly greater delays in connecting. Market forces will tend to set the rates for the types of service, with the first rate likely to be much higher than the second rate. Network capabilities will set the levels of access available, such that contracts may need to be updated as network popularity rises or build-outs occur.

In another alternate embodiment, service is offered to subscribers based on payment or status of the subscribers. Subscribers may pay for greater or lesser priority of access to the network. Alternatively, certain classes of subscribers may be given preferential treatment with respect to access to the network. Furthermore, account history and usage history of the subscribers may be used to determine whether the subscriber may have access to the network, giving users who have not used the network recently an advantage for example. Additionally, records of the equipment used by the subscriber or information about this equipment encoded in requests from the subscriber may be used to determine what kind of access to the network is available.

Note that in offering service based on probability of access or subscriber status, records need not be kept of actual access for billing purposes. Since the service offered is a probability of using the system rather than an amount of time or amount of resources on the system (the network for example), the service is not dependent on how much the system is actually used, only on whether the system is available to the subscriber as required. Alternatively, access to the network may be offered in terms of different types of access to the network, such as high- or low-bandwidth connections to the network for example.

It will be appreciated with respect to the immediately following portion of the description that the type of network used need not limit the spirit and scope of the invention. In particular, the methods and apparatuses may be used in conjunction with a variety of networks, such as wireless or hard-wired networks for example, and that the methods and apparatuses may be applied in analogous ways to various types of networks within the spirit and scope of the invention.

FIG. 1A illustrates communications between an embodiment of a base station and an embodiment of a user terminal. The base station 1030 may be coupled to a network 1040 such as the internet or a private network of some form. The base station 1030 then may provide and control access between the network 1040 and user terminals 1020, with communication between the base station 1030 and the user terminal 1020 occurring through use of an antenna array portion of the base station 1030. The user terminal 1020 may be coupled to one or more end user devices 1010, thus allowing for a coupling or connection between an end user device 1010 and the network 1040. In one embodiment, packets 1015 are exchanged between the end user device 1010 and the user terminal 1020. Note that in some embodiments, the end user device 1010 and the user terminal 1020 may be packaged together to appear as one device, and the packets 1015 may be small amounts of information which are assembled into larger packets by the user terminal 1020.

It will be appreciated that a wide variety of devices which may be a user terminal 1020 or end user device 1010. For example, a user terminal 1020 may be a modem which is incorporated into an end user device 1010, or some other device such as a network card, provided that it allows for access to a network by another device or a system of which the user terminal 1020 is a part. The end user device 1010, likewise, may be a computer for example, or a cellular phone (which may contain modem circuitry as a user terminal 1020), a two-way pager, or any number of other devices designed to have a connection to a network. In one embodiment, the network of base stations 1030 is a cellular network, the end user devices 1010 are cellular phones, and the user terminal 1020 is the modem and associated circuitry within each cellular phone.

The user terminal 1020 may initiate communications with the base station 1030. In one embodiment, the user terminal 1020 may initiate communications by sending a request to send (RTS) signal 1023, and the base station 1030 may then respond with a clear to send (CTS) signal 1026, indicating that communications may proceed. The user terminal 1020 may initiate communications for a variety of reasons, including a request to communicate from the base station 1030 or a request to communicate from an end user device 1010. The user terminal 1020 may also receive a page 1050 which need not come directly from the base station 1030, but which may result in initiation of communications with the base station 1030. Once communications are initiated between the base station 1030 and the user terminal 1020, such communications may proceed in a variety of well-known manners.

Figure 1B:
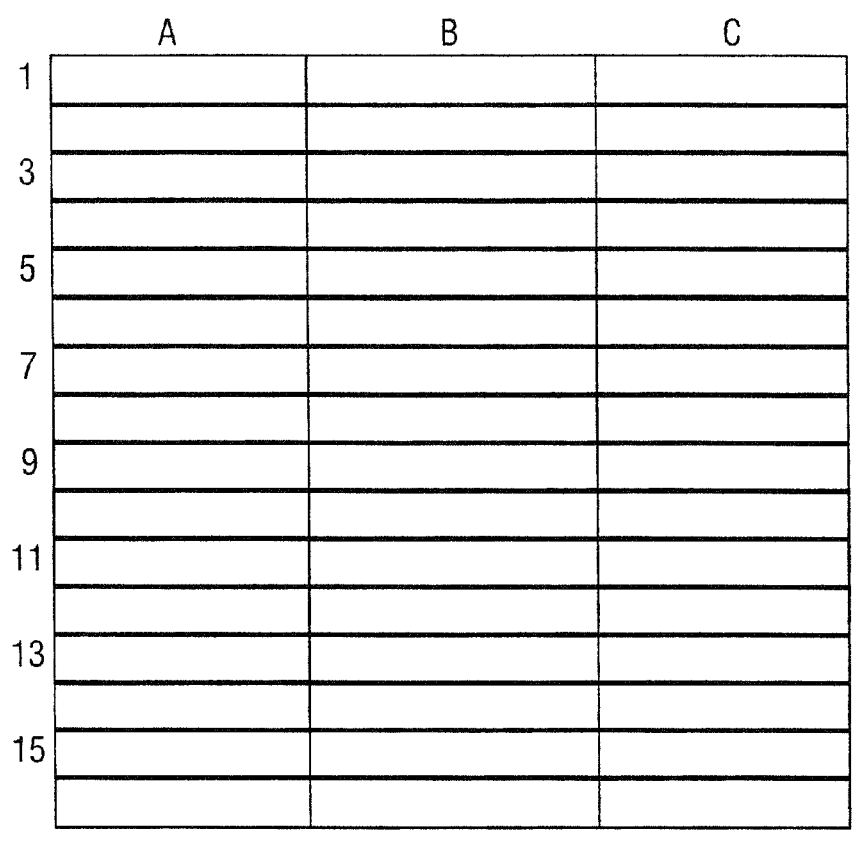

FIG. 1B illustrates an embodiment of a grid of channels (which may be one representation of a plurality of channels). In one embodiment, communications between the user terminal 1020 and the base station 1030 may proceed through use of one or more of the channels illustrated, both for initiation of communications and for continuing communication and transmission of data. In the embodiment illustrated, a grid of 16 channels by three channels is presented. It will be appreciated that such a grid may represent a set of channels having unique codes, a set of channels having unique timeslots, or a set of channels having unique frequencies among other divisions. Furthermore, it will be appreciated that the set of channels may be organized in a variety of different ways with different relationships among the channels and a different number of channels.

Figure 2:
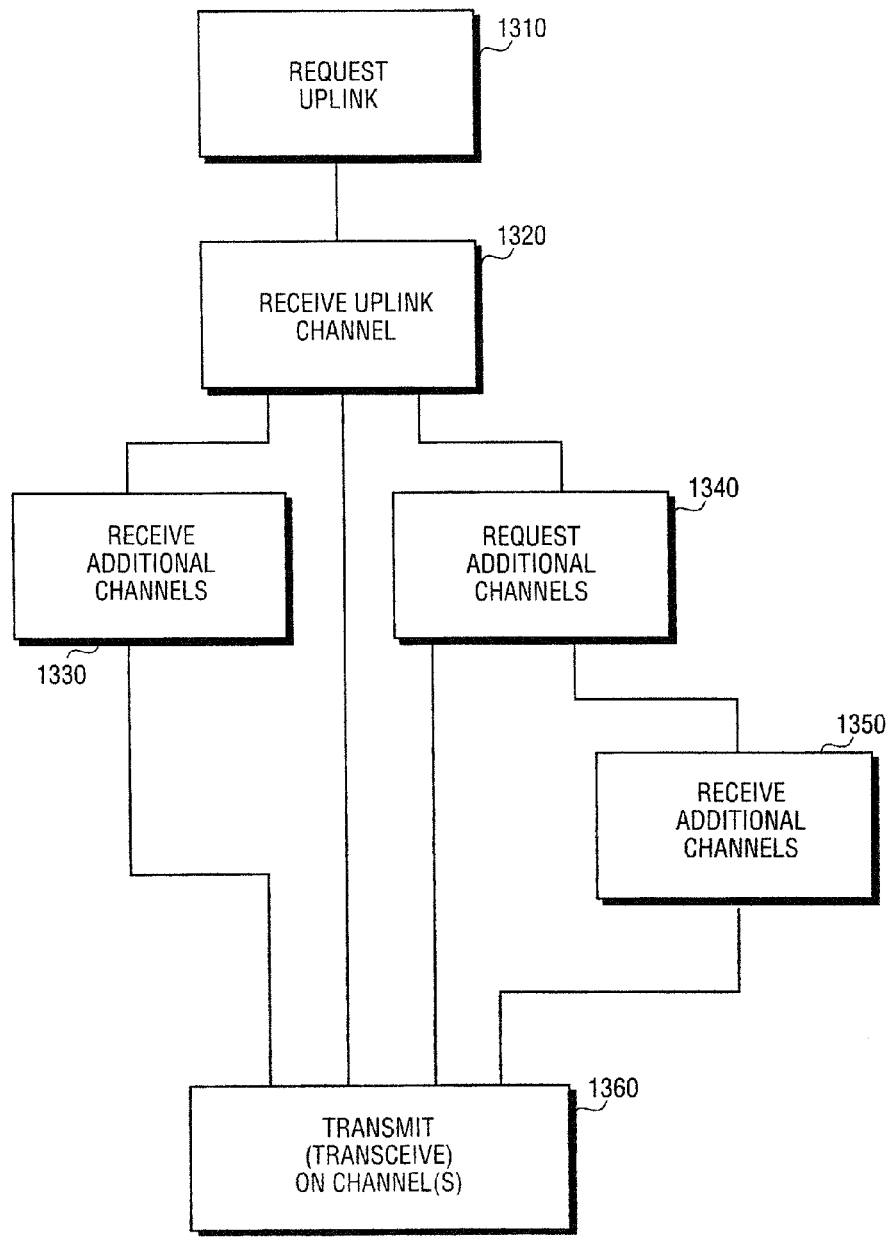
FIG. 2 illustrates an embodiment of a process of requesting an uplink.

FIG. 2 illustrates an embodiment of a process of requesting an uplink channel. At block 1310, the user terminal 1020 requests an uplink channel to the base station 1030 for purposes of sending information to the network 1040. Such an uplink channel may be requested because the end user device 1010 has information to send to the network 1040 for example. At block 1320, an uplink channel is received, allowing for transmission of information to the base station 1030 and thus to the network 1040. This may result in progression to block 1360 and transmission or transmission and reception of information between the user terminal 1020 and the base station 1030.

If transmission and loading conditions allow, the base station may also provide additional channels for transmission at block 1330. Similarly, the user terminal may request additional channels at block 1340, whether these additional channels are determined to be necessary or merely desirable. At block 1350, the additional channels may be made available to the user terminal 1020 by the base station 1030. Whether the process proceeds to block 1350 or not, the process eventually proceeds to block 1360 as described above.

Note that each of the grants of channels depends on the base station 1030 receiving the request either for an initial channel or additional channels from the user terminal 1020, such that in some congested networks or poorly covered geographical areas, the request may simply not be received by the base station 1030. Similarly, if an initial channel or additional channels are not provided within a predetermined length of time, this may operate as a denial of a request, even though no positive action was signaled to the user terminal 1020 indicating such a denial.

Figure 3:
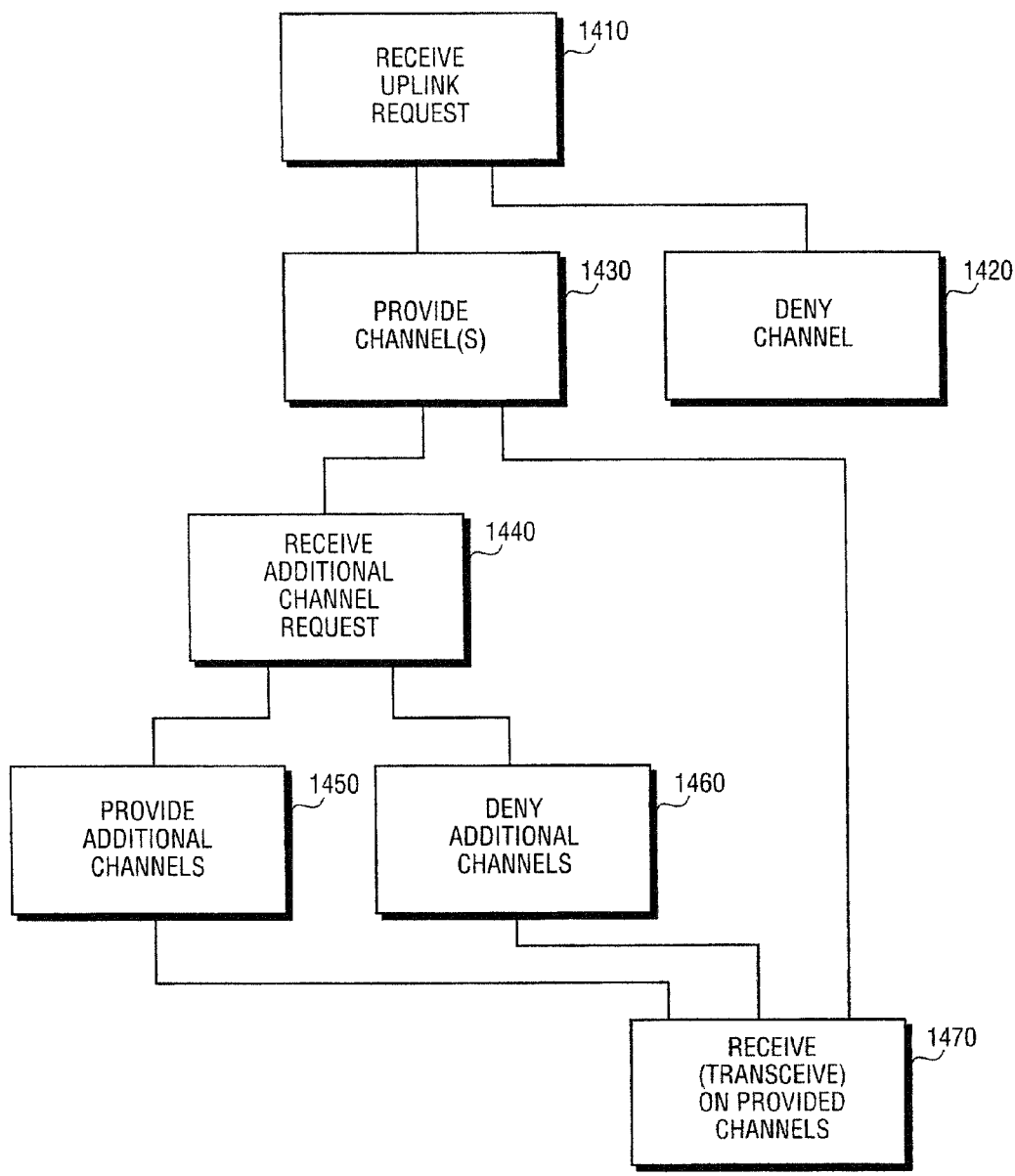
FIG. 3 illustrates an embodiment of a process of providing an uplink.

FIG. 3 illustrates an embodiment of a process of providing an uplink channel. At block 1410, the base station 1030 receives an uplink request from a user terminal 1020. If channels are available to supply the request, at least a first channel is provided at block 1430, otherwise no channels are provided and the request is denied at block 1420. Note that the first channel provided is not necessarily the channel requested, it may be a second or third channel for example, and potentially, additional channels may be provided immediately. As described above, the denial may be an explicit denial signaled to the user terminal 1020 by the base station 1030, or it may be an implicit denial which the user terminal 1020 understands from the silence of the base station 1030 in response to the request.

If no additional requests for channels are received, the process may proceed from provision or granting of channels to receiving or transmitting and receiving on the provided channel or channels at block 1470. If an additional request for channels is received at block 1440, the base station 1030 may either provide additional channels at block 1450 or deny the additional channels at block 1460, and then the process proceeds to block 1470. It will be appreciated that for the processes illustrated with respect to FIGS. 2 and 3, a request for additional channels and a change in the number of channels available may occur while reception or transmission is occurring, depending on system needs, the nature and progress of the communication between the base station 1030 and the user terminal 1020, or changes in the activity of the end user terminals 1010 for example.

Figure 4:
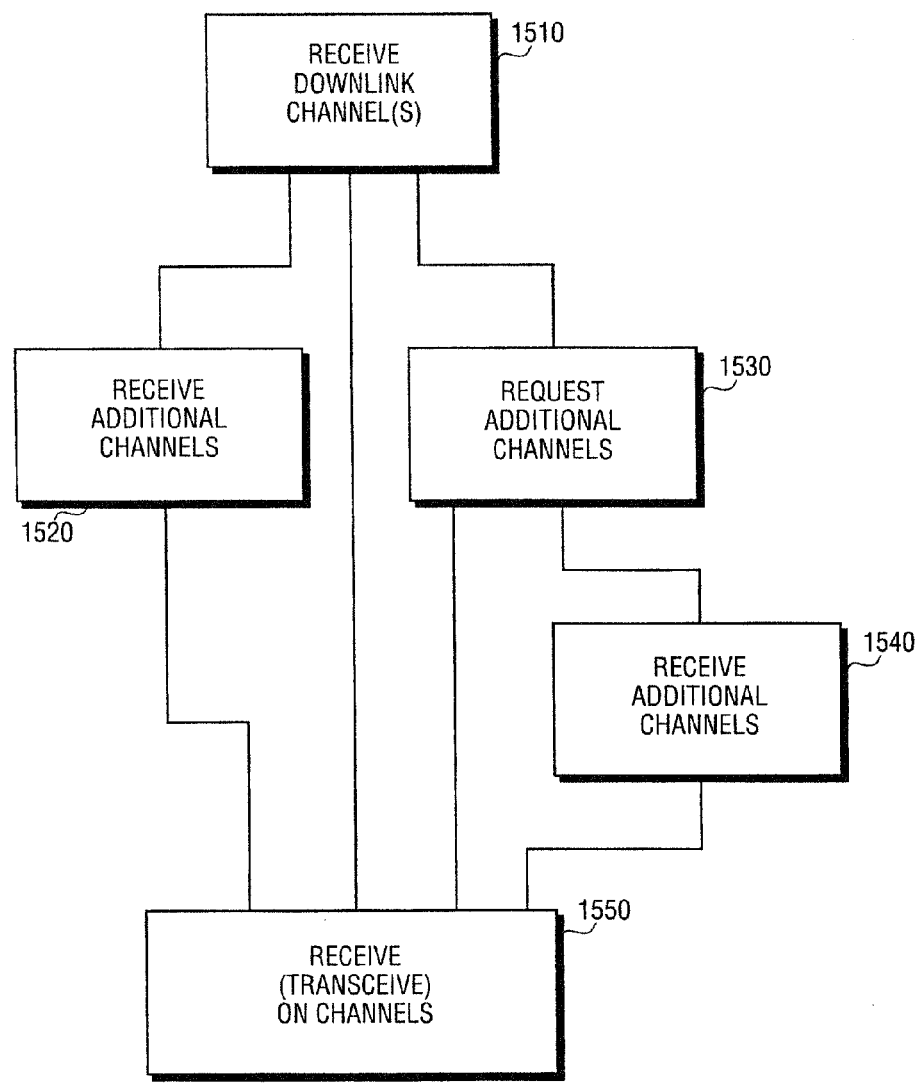
FIG. 4 illustrates an embodiment of a process of receiving a downlink.

FIG. 4 illustrates an embodiment of a process of receiving a downlink. In some instances, a downlink may be provided from a base station 1030 to a user terminal 1020 to provide information to the user terminal 1020 for example. In such an instance, the user terminal 1020 may receive a channel or channels initially at block 1510, and this may be sufficient such that the information may be communicated to the user terminal 1020 at block 1550. In some embodiments, additional channels may be received by the user terminal 1020 at block 1520, whether due to system changes or recognition of other reasons for providing additional channels (such as a requirement that first an initial channel be provided followed by additional channels for example). Alternately, in some embodiments, the user terminal 1020 may request additional channels at block 1530, and those channels may be received at block 1540 or simply not received, whether denied explicitly or not. The request for additional channels of block 1530 may be made in-band on the channel already established, or a request may be made on a channel which is accessible by the user terminal but is not currently in use by the user terminal. Regardless, once a channel or channels have been received, the user terminal may receive or receive and transmit information at block 1550.

Figure 5:
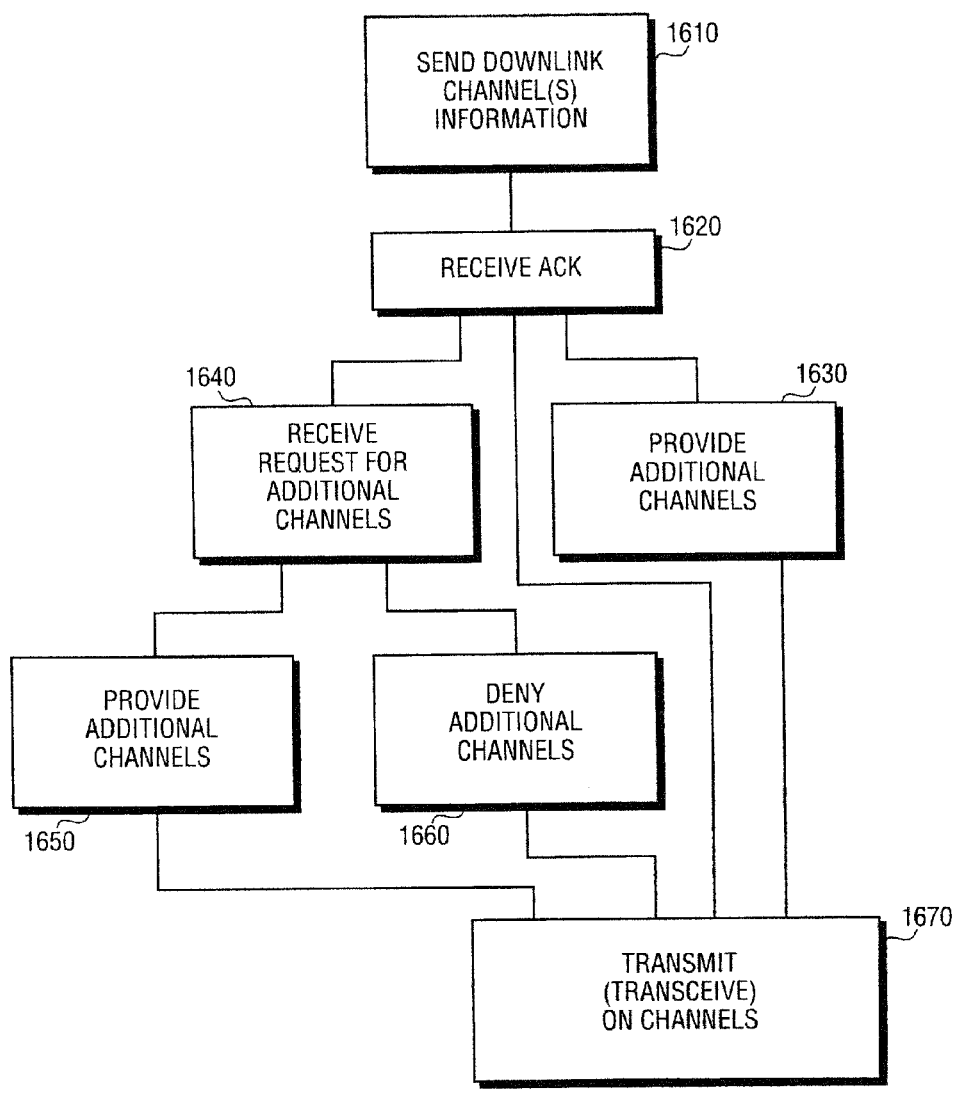
FIG. 5 illustrates an embodiment of a process of providing a downlink.

FIG. 5 illustrates an embodiment of a process of providing a downlink. At block 1610, channel information for the downlink is sent from the base station 1030 to the user terminal 1020, such as information on what channel(s) to use for example. At block 1620, the user terminal 1020 acknowledges the information sent, and this may be sufficient such that transmission or transmission and reception of information then proceeds at block 1670. Alternately, additional channels may be provided at block 1630. Furthermore, additional channels may be requested at block 1640 by the user terminal 1020, and such additional channels may be provided at block 1650 or the request may be denied at block 1660. In any event, once the channel(s) are provided, communication of information may then proceed at block 1670.

As was pointed out previously with respect to FIGS. 2 and 3, the processes illustrated in FIGS. 4 and 5 may include changes in the allocation of channels during communication, for various reasons such as those pointed out previously with respect to FIGS. 2 and 3. Such changes may occur due to an influx of high priority subscribers into the system, thus resulting in fewer resources available to lower priority subscribers already connected to the system. Such changes may also occur due to failures of equipment within the network and dynamic adaptation or reconfiguration of the network to minimize the impact of such failures.

Figure 6:
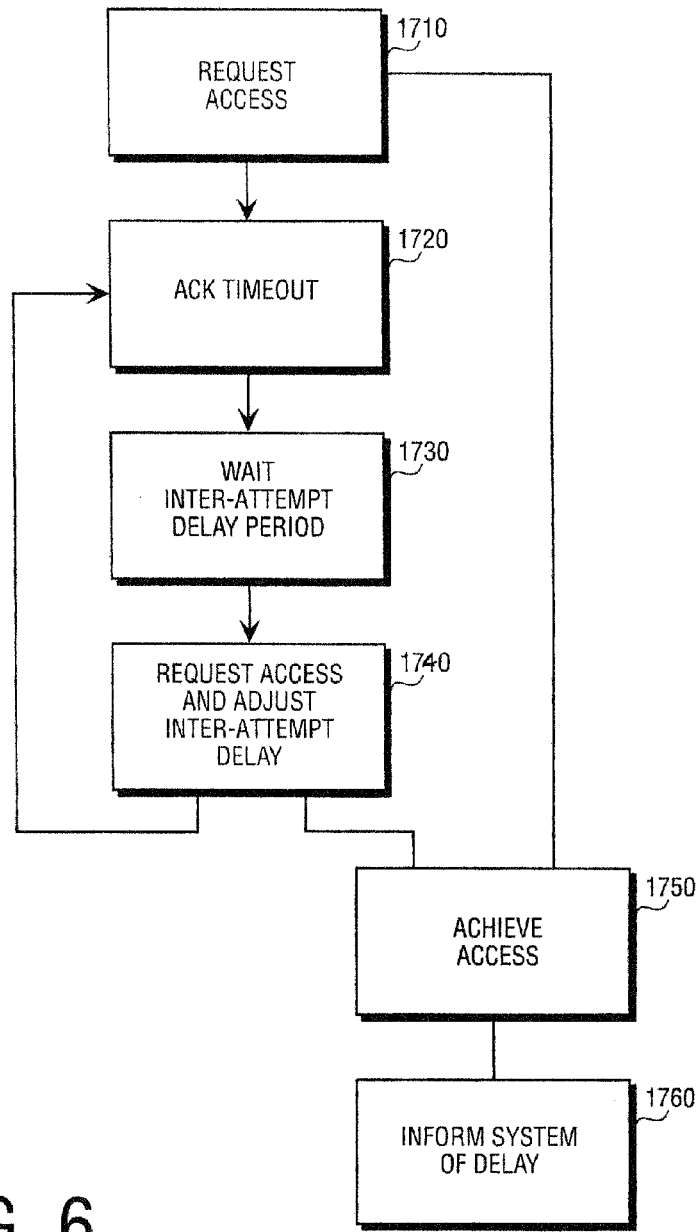
FIG. 6 illustrates an embodiment of a process of requesting access.

FIG. 6 illustrates an embodiment of a process of requesting access. At block 1710, an initial request for access is made. If this attempt succeeds, at block 1750, then the user terminal 1020 and the base station 1030 may communicate, and the user terminal provides information on how long the access attempt lasted at block 1760. If this attempt does not succeed before a predetermined length of time passes, and an acknowledgement timeout occurs at block 1720. The user terminal 1020 then waits for a period of time known as an inter-attempt delay at block 1730. The user terminal 1020 then adjusts the inter-attempt delay period and again requests access to the base station 1030. Again, the predetermined length of time for an access may pass, either resulting in the acknowledgement timeout of block 1720 or access at block 1750. Whenever access is achieved, the user terminal 1020 informs the system of the delay incurred in getting access, which the system may then use to determine loading or latency within the system.

The inter-attempt delay (IAD), in one embodiment, is expressed as the following parameterized equation:

$$IAD = C_0 + C_1 e^{(aC_2 + C_3)}$$

In this instance, $C_0$, $C_1$, $C_2$ and $C_3$ are parameters which may be supplied by the system to the user terminal 1020, and a is the number of attempts made to access the system. Note that these parameters may be adjustable by the system, such that if a user terminal 1020 is experiencing unreasonable delays in accessing the system the IAD may be decreased, or if access is too easily available, the IAD may be increased. In an alternate embodiment, the inter-attempt delay may be expressed as:

$$ICD = \min(C_{max}, C_0 + C_1 e^{(aC_2 + C_3)})$$

Wherein min( ) is a minimization function and $C_{max}$ represents a maximum value which the IAD may reach, thus eliminating the possibility of too much of a runaway increase the IAD. Furthermore, it will be appreciated that a random or pseudo-random value may be introduced such that when two devices are given the same parameters, the devices will not always encounter the exact same calculated delays and potentially attempt to use the same resources simultaneously.

Figure 7:
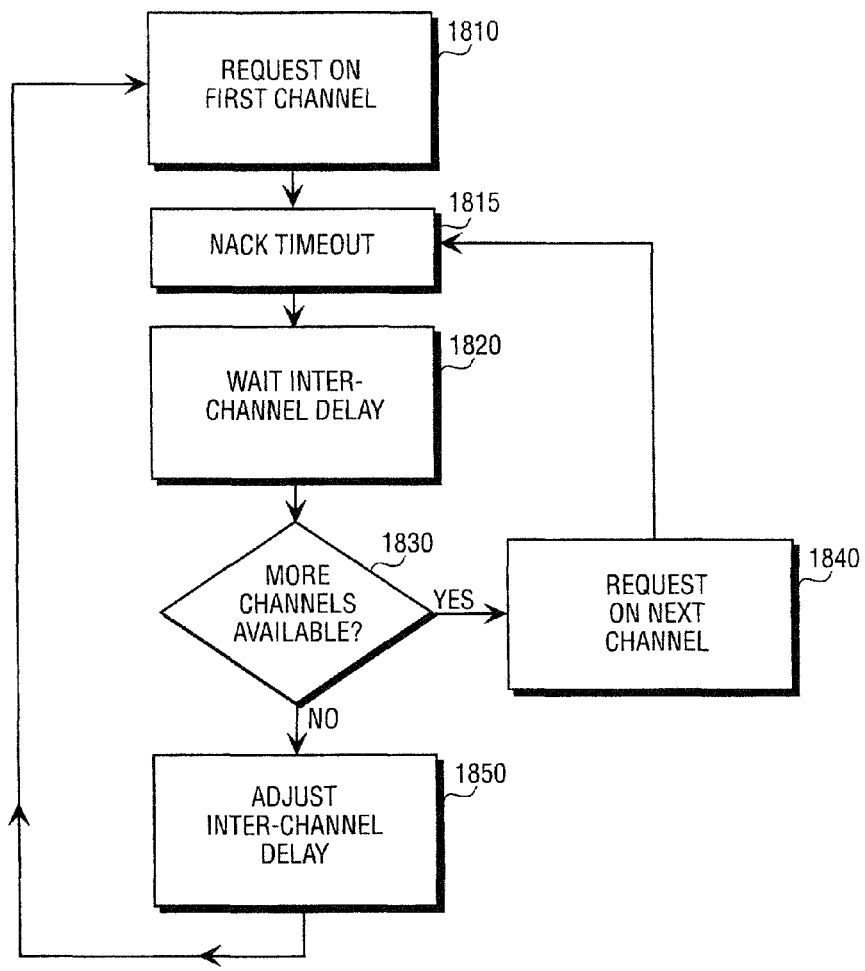
FIG. 7 illustrates an embodiment of a process of requesting a channel.

FIG. 7 illustrates an embodiment of a process of requesting a channel. The attempt to access the network described with respect to FIG. 6 may include an attempt on each channel available, such as the channels of FIG. 1B or a restricted subset thereof. Thus, at block 1810, a request for a first channel is made. After a predetermined length of time (a channel nack or channel no-acknowledgement timeout delay), it may be assumed that the request was either denied or not received at block 1815. Note that an attempt or access failure may also be encountered, when the attempt to access the network on all available channels does not succeed. This typically would not take the form of a timeout, but would have a similar effect with regard to ending an access attempt.

A request on the next potentially available channel is delayed by the inter-channel delay at block 1820. At block 1830, a determination is made as to whether any channels are available which have not had a request made during this access attempt. If so, at block 1840, the next channel is requested, and the reject with retry or nack timeout delay is used to determine whether the channel has been granted. If no channels remain available for requests during this attempt, then the inter-channel delay is adjusted based on a failure on all channels, and the user terminal 1020 waits until it can begin a new series of requests. Reaching block 1850 indicates that the access attempt has failed in one embodiment, thus leading to a wait of the inter-attempt delay before beginning a new access attempt. Note that a request for a channel may be actively rejected in at least two ways. A request may be rejected outright, indicating that another attempt will not be successful in the near-term future, or it may be rejected with retry, indicating that another attempt may be made soon with some probability of success.

The inter-channel delay may also take a similar form of a parameterized equation in one embodiment, such as this equation:

$$ICD = D_0 + D_1 e^{(aD_2 + D_3)}$$

Again, $D_0$, $D_1$, $D_2$ and $D_3$ may be programmable constants, and a may represent the number of attempts, allowing for changes in the delay as system conditions change. In an alternate embodiment, the inter-channel delay may be expressed as:

$$ICD = \min(D_{max}, D_0 + D_1 e^{(aD_2 + D_3)})$$

Wherein min( ) is a minimization function and $D_{max}$ represents a maximum value which the ICD may reach, thus eliminating the possibility of too much of a runaway increase the ICD. Furthermore, it will be appreciated that a random or pseudo-random value may be introduced such that when two devices are given the same parameters, the devices will not always encounter the exact same calculated delays and potentially attempt to use the same resources simultaneously.

Note that the channels available for request may not include all of the channels. Some channels may be off-limits to some user terminals 1020, due to various factors, including but not limited to subscriber status (payment status, service agreements, social/priority status for example), geographic location, user terminal capabilities, access/traffic type, system status, or other factors. Thus, the user terminal 1020 may have preprogrammed or otherwise receive a bitmap or other indication of which channels are allowable for access (which may be requested) and which channels are not allowed. Moreover, the base station 1030 may receive an identification of the requestor of a channel as part of the request, and determine whether the requestor is allowed to request the given channel.

Figure 8:
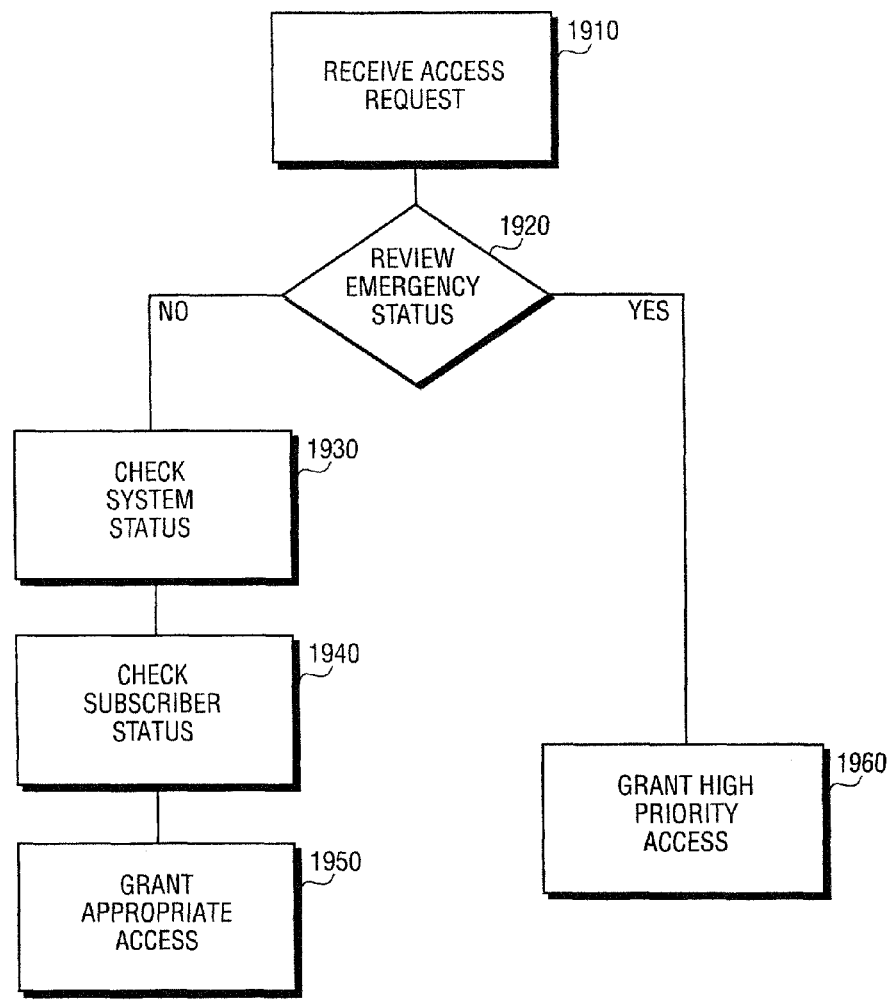
FIG. 8 illustrates an embodiment of a process of providing access.

FIG. 8 illustrates an embodiment of a process of providing access. At block 1910, the base station 1030 receives a request for access. At block 1920, the base station 1030 checks whether the access request has emergency status, such as a cellular call directed to a central emergency number or a cellular call coming from an identified police or other high-priority agency. If such an emergency situation exists, high priority access to the system may be granted at block 1960.

If such a situation does not exist, the status of the system (busy, not busy for example) is checked at block 1930 and the status of the subscriber is checked at block 1940. The status of the subscriber may be determinable based on the type of access purchased by the subscriber (high-priority access for a higher fee for example), the importance of the subscriber (high-priority access for government officials for example), or the type of access requested by the subscriber (some forms of communication may be favored within the system for various reasons for example). Other methods of determining subscriber status, such as whether the subscriber's account is current, may also be appropriate.

Similarly, the status of the system is checked, and this may involve considerations such as system maintenance status, bandwidth availability, clarity of the incoming signal, or other requests pending for example. After these determinations are made, appropriate access to the network may be granted through the base station 1030 at block 1950.

It will be appreciated that the requests and other communications within the above described method and apparatus may take a variety of forms. For example, the requests may imply a request for the channel carrying the request, for any channel, or the request may encode a desired channel. The communications of channel availability may be silent when the network denies the request, may explicitly deny the request, may indicate clearance to send when the channel used or desired (if encoded) is available, or may assign a specific channel.

The inter-attempt and inter-channel delays above represent two parameters on subscriber devices (user terminals or end-user devices for example) which may be set based on the quality of service offered. It will be appreciated that other parameters and processes within the base station or network may also be affected by the quality of level of service offered, allowing for further refinement of differences in service offerings. For example, the number of channels available may be affected, either by restricting a subscriber from attempting access to some channels or always refusing access to some channels for lower priority subscribers. Furthermore, subscribers failing to follow the rules established for the subscriber's class of service may be restricted from accessing the network at all.

In some embodiments, training sequences may be used within a system. These training sequences may have a variety of applications. For example, a training sequence may be used to evaluate the current jitter, skew and delay involved in transmissions to and from and end user terminal. Additionally, training sequences may be designated, such that when a given training sequence is received, a type of equipment or type of subscriber is thereby identified. Additionally, training sequences may be designated such that a type of communication or transaction, such as a data or voice communication, a response to a page or a switch to a channel designated by a base station is identified. Thus, a training sequence may be included as part of a request for access or may be used separately after access is established. In one embodiment, a training sequence may further be used to determine which antenna or set of antennas out of a plurality of available antennas should be used to listen to or talk to a subscriber device such as a user terminal.

The following additional description relates to a specific type of network with which the previously described methods and apparatuses may be used. It will be appreciated by one skilled in the art that application of the methods and apparatuses is not limited to the wireless spatial processing network described below. Rather, it will be appreciated that various different types of networks may be used in conjunction with the previously described methods and apparatuses.

Basic Structure

Figure 9:
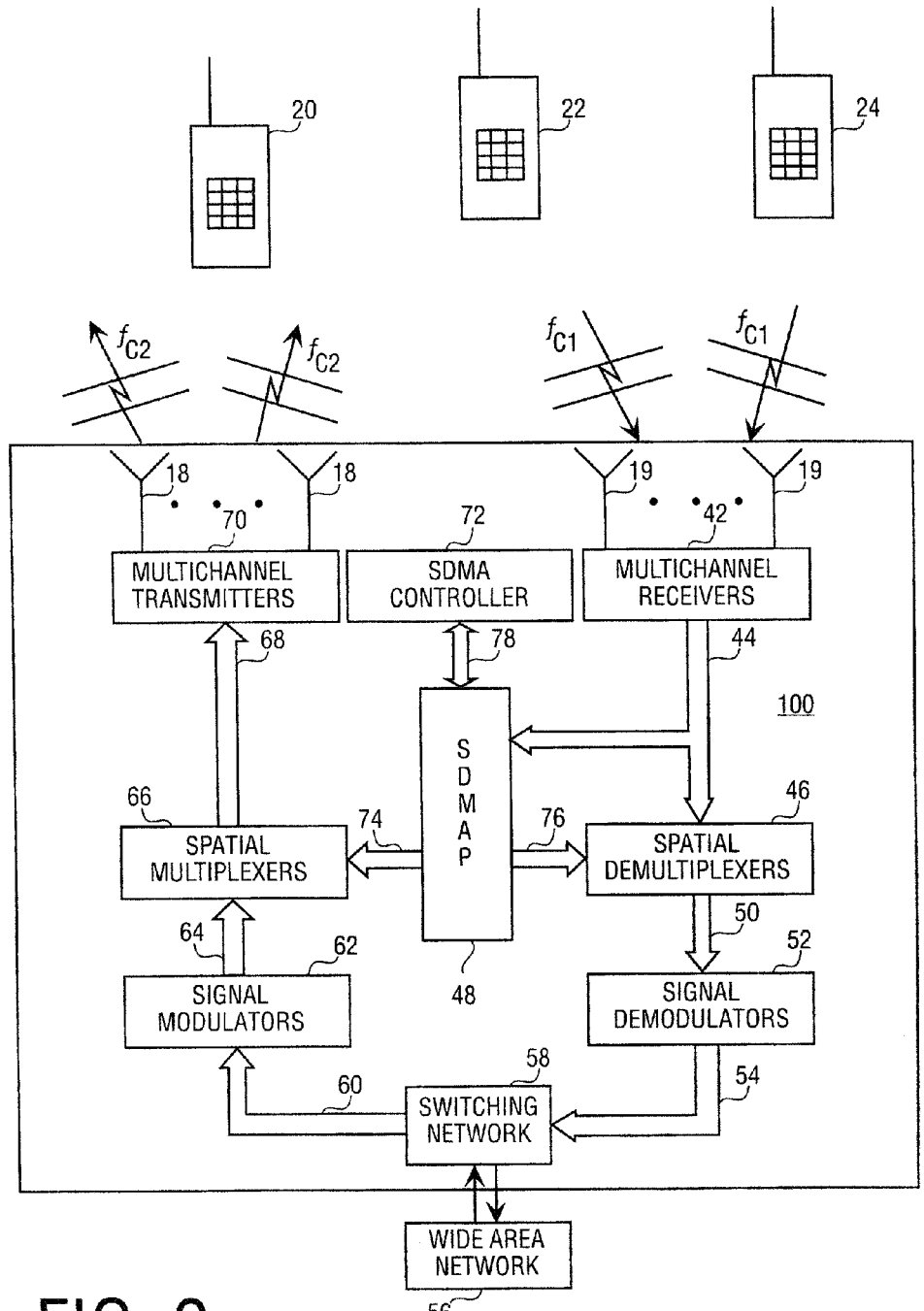
FIG. 9 is a diagram illustrating an exemplary architecture of a wireless communication system according to one embodiment of the present invention.
Figure 10:
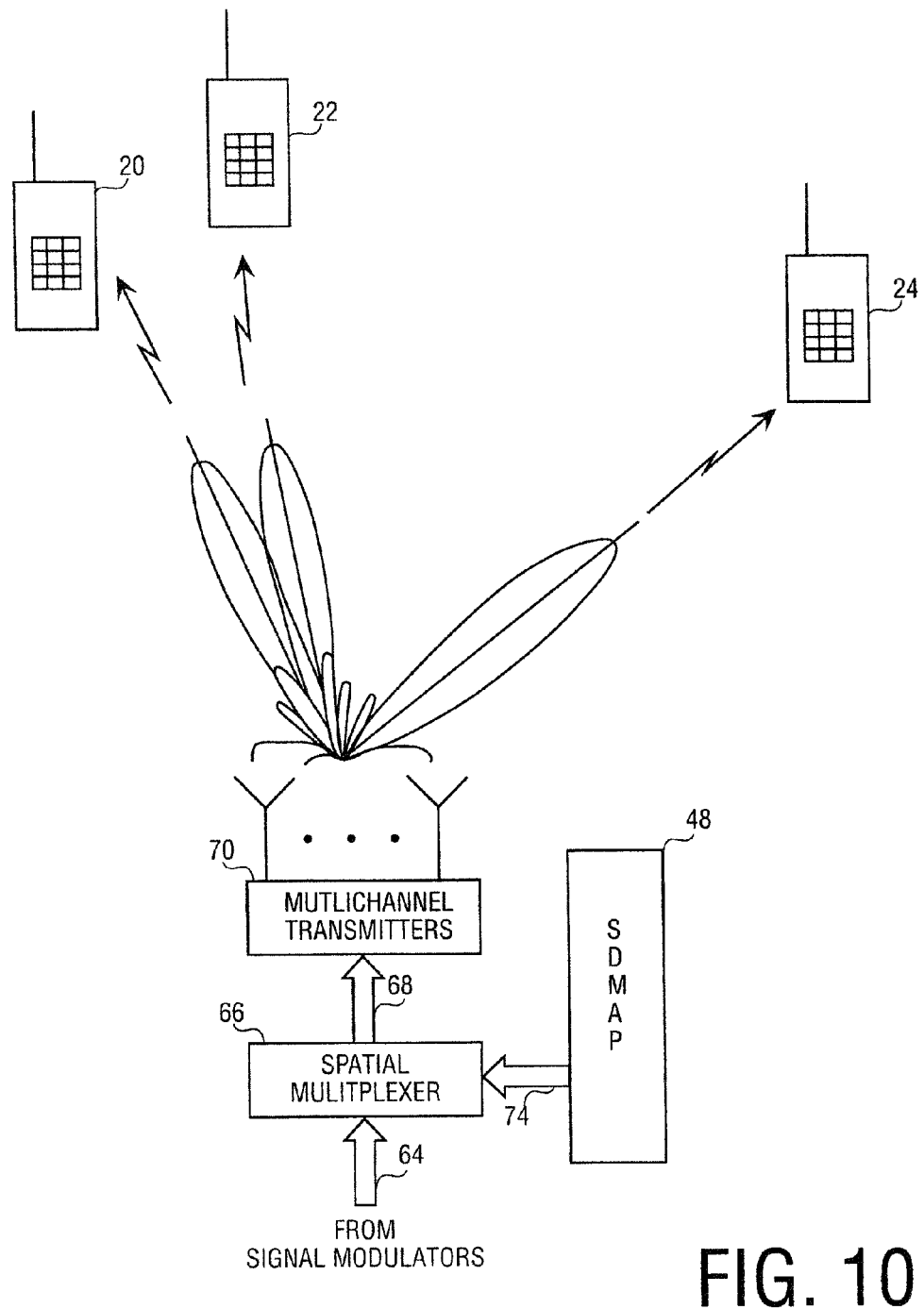
FIG. 10 is a diagram illustrating transmission patterns of a multi-channel spatial diversity transmitter according to one embodiment of the present invention.

FIG. 9 shows an example of a wireless communications system or network in which a number of subscriber stations, also referred to as remote terminals or user terminals, (symbolically shown as handsets) 20, 22, 24, are being served by a base station 100 that may be connected to a wide area network (WAN) 56 for providing any required data services and connections external to the immediate wireless system. The present invention relates to wireless communication systems and may be a fixed-access or mobile-access wireless network using spatial division multiple access (SDMA) technology in combination with multiple access systems, such as time division multiple access (TDMA), frequency division multiple access (FDMA) and code division multiple access (CDMA). Multiple access can be combined with frequency division duplexing (FDD) or time division duplexing (TDD). A switching network 58 interfaces with a WAN 56 for providing multi-channel duplex operation with the WAN by switching incoming WAN data to lines 60 of the base station 100 and switching outgoing signals from the base station 100, on lines 54 to the WAN. Incoming lines 60 are applied to signal modulators 62 that produce modulated signals 64 for each subscriber station to which the base station is transmitting. A set of spatial multiplexing weights for each subscriber station are applied 74 to the respective modulated signals in spatial multiplexers 66 to produce spatially multiplexed signals 68 to be transmitted by a bank of multi-channel transmitters 70 using a transmit antenna array 18. The SDMA processor (SDMAP) 48 produces and maintains spatial signatures for each subscriber station for each conventional channel, calculates spatial multiplexing and demultiplexing weights for use by spatial multiplexers 66, and spatial demultiplexers 46, and uses the received signal measurements 44 to select a channel for a new connection. In this manner, the signals from the current active subscriber stations, some of which may be active on the same conventional channel, are separated and interference and noise suppressed. When communicating from the base station to the subscriber stations, an optimized multi-lobe antenna radiation pattern tailored to the current active subscriber station connections and interference situation is created. An example of a transmit antenna pattern that may be created is shown in FIG. 10. Suitable technologies for achieving such a spatially directed beam are described, for example, in U.S. Pat. Nos. 5,828,658, issued Oct. 27, 1998 to Ottersten et al. and 5,642,353, issued Jun. 24, 1997 to Roy, III et al.

Returning to FIG. 9 spatial demultiplexers 46 combine received signal measurements 44 from the multi-channel receivers 42 and associated antenna array 19 according to spatial demultiplexing weights 76, a separate set of demultiplexing weights being applied for each subscriber station communicating with the base station. The outputs of the spatial demultiplexers 46 are spatially separated signals 50 for each subscriber station communicating with the base station. In an alternate embodiment, the demultiplexing and demodulation processing are performed together in a nonlinear multidimensional signal processing unit. The demodulated received signals 54 are then available to the switching network 58 and the WAN 56. The multi-channel receivers also receive timing signals from GPS (Global Positioning System) satellites or some other radio precision timing signal which is then provided to the SDMAP for precise timing that is synchronized across all base stations in the system.

In an FDMA system implementation, each multi-channel receiver and each multi-channel transmitter is capable of handling multiple frequency channels. In other embodiments, the multi-channel receivers 42 and multi-channel transmitters 70 may instead handle multiple time slots, as in a TDMA system, multiple codes, as in a CDMA system, or some combination of these well-known multiple access techniques.

Figure 11:
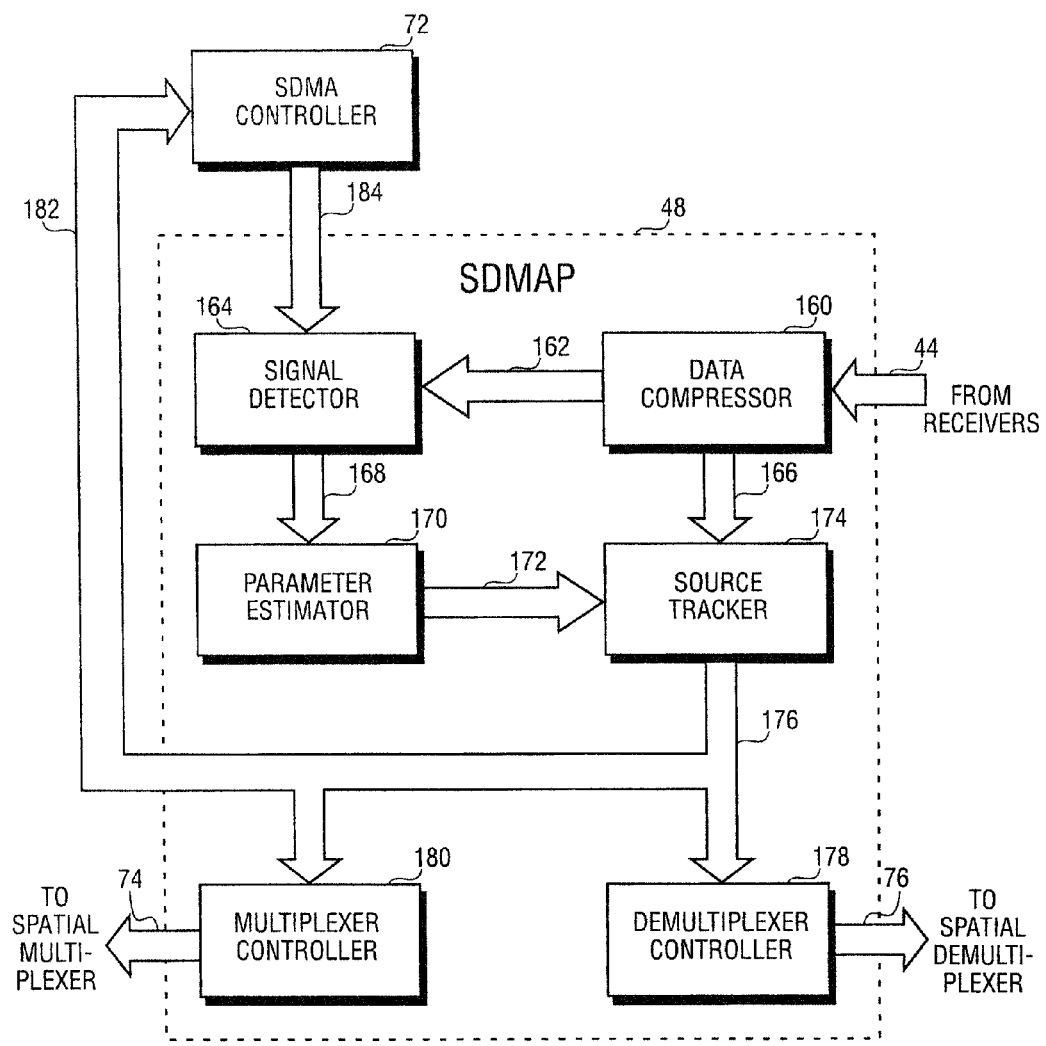
FIG. 11 is a block diagram illustrating a spatial diversity multiple access processor according to one embodiment of the present invention.

FIG. 11 shows a breakdown of a Spatial Division Multiple Access signal Processor (SDMAP) 48. The function of the SDMAP includes determining how many signals are present in a particular channel, estimating signal parameters such as the spatial location of the transmitters (i.e., directions-of-arrival (DOAs) and distance from the base station), and determining the appropriate spatial demultiplexing and multiplexing schemes. The inputs 44 to the SDMAP include outputs of base station receivers, one for each receiving antenna. In one embodiment, the receivers perform quadrature detection of the signals as in current systems, in which case there are in-phase (I) and quadrature (Q) components (signals) output from each channel behind each antenna. In another embodiment, a single down-converted component, I or Q or any combination thereof, is used. In one embodiment, the receivers digitize the data before passing it to the SDMAP. In another embodiment, digitization is performed in the data compressor 160.

In one embodiment of the invention, the SDMAP accomplishes its task by first obtaining estimates of important signal related parameters such as their directions-of-arrival (DOAs) without exploiting temporal properties of the signal. This is appropriate, for example, in situations where analog modulation schemes are employed and little is known about the signal waveform. In a second embodiment, known training sequences placed in digital data streams for the purpose of channel equalization can be used in conjunction with sensor array information to calculate signal parameter estimates such as DOAs and signal power levels. This information is then used to calculate appropriate weights 76 for a spatial demultiplexer, implemented in this embodiment as a linear combiner, i.e., a weight-and-sum operation. In a third embodiment, time-of-arrival (TOA)-related parameters from the parameter estimator are used in conjunction with signal correlation parameters to ascertain which signals are multipath versions of a common signal. Relative delays are then calculated such that the signals can be coherently combined, thus further increasing the quality of the estimated signals.

However, in another embodiment of this invention, the function of the spatial demultiplexer is performed in conjunction with the estimation of other source parameters such as the DOAs. As an example of one such embodiment of this type, the constant modulus property (i.e., constant amplitude) of various communication signals such as digital phase-shift-keyed (PSK) and analog FM waveforms can be exploited along with properties of the array of receiving antennas to simultaneously estimate the source waveforms as well as their DOAs using multi-channel constant-modulus algorithms (CMA) which are well-known in the art.

In another embodiment, extended Kalman filters, also well-known in the art, can be used to exploit these and similar properties. In these and similar embodiments, the function of the spatial demultiplexer 46 is assumed by the SDMAP 48, and the outputs 76 of the SDMAP are the spatially demultiplexed signals to be sent to the demodulators.

Referring again to FIG. 11, data compression 160 is performed to reduce the amount of data, and, in one embodiment, consists of accumulation of a sample covariance matrix involving sums of outer products of the sampled receiver outputs in a particular channel. Hereafter, these sampled outputs are referred to as data vectors, and there is one such data vector at each sample time for each of the channels assigned to a particular base station. In another embodiment, the compressed data are simply the unprocessed data vectors. If I and Q signals 44 are output from the receivers, each data vector is a collection of $m_r$ complex numbers, one for each of the $m_r$ receiver/antenna pairs.

In a third embodiment, data compression also includes using known signal information such as training sequences present in wireless digital systems and mobile unit transponder responses in current analog systems to calculate time-of-arrival (TOA) of a distinct periodic signal feature, a parameter containing valuable information related to the distance between cell sites and the wireless transmitter which is exploited in this embodiment.

Compressed data 162 are passed to a signal detector 164 for detection of the number of signals present in the channel. In one embodiment, statistical detection schemes are employed in conjunction with information from a SDMA controller 72 to estimate the number of sources present in the channel. This information and the (compressed) data 168 are sent to a parameter estimator 170 where estimates of signal parameters including those related to the source locations (e.g., DOAs and range) are obtained.

Location-related parameter estimates 172 are passed to a source tracker 174. In one embodiment, the function of the source tracker is to keep track of the positions of each of the transmitters as a function of time. This is implemented by known nonlinear filtering techniques such as the aforementioned extended Kalman filter (EKF). In another embodiment, velocities and accelerations of each of the wireless units in a particular channel are tracked as well. Inputs to the EKF in one embodiment include the DOAs and TOAs from the local base station. In another embodiment, DOA and TOA measurements from other nearby cell sites also receiving transmissions from the mobile units are incorporated along with known locations of the cell sites to further improve the estimation accuracy of the EKF as is well-known in the art. The tracker 174 outputs are sent along with the (compressed) data 176 to a spatial demultiplexer controller 178, to control the function of the spatial demultiplexer, and to a spatial multiplexer controller 180 to control the function of the spatial multiplexer.

Figure 12:
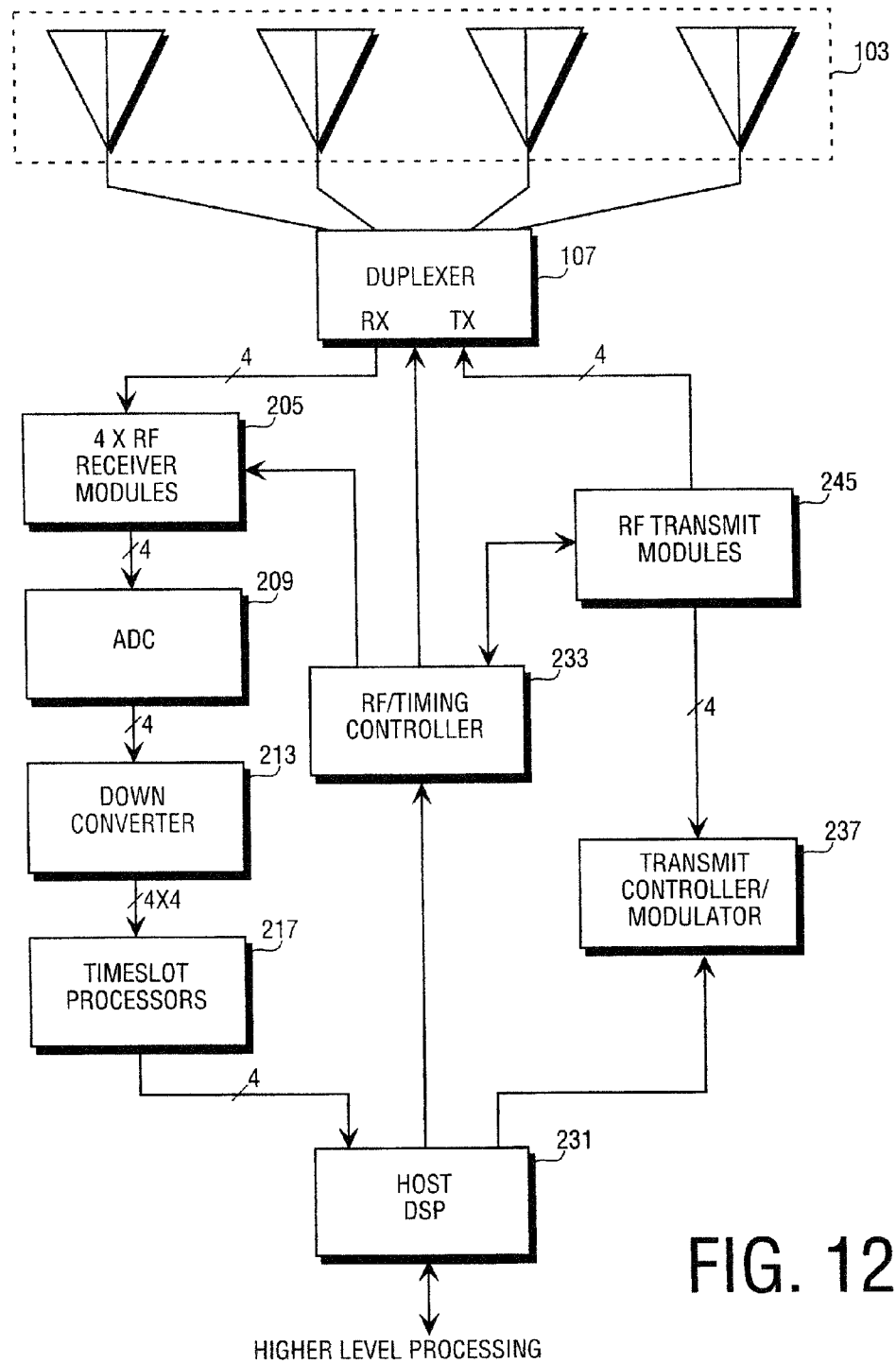
FIG. 12 is a simplified block diagram of a base station on which an embodiment of the invention can be implemented.

FIG. 12 shows an alternative embodiment of a wireless communications system suitable for implementing the present invention. This system is typically coupled to a switching network and WAN similarly to the system of FIG. 9 such as switching network 58 and WAN 56. In FIG. 12, a plurality of antennas 103 is used, for example four antennas, although other numbers of antennas may be selected. The outputs of the antennas are connected to a duplexer switch 107, which in this TDD system is a time switch. Two possible implementations of switch 107 are as a frequency duplexer in a frequency division duplex (FDD) system, and as a time switch in a time division duplex (TDD) system. When receiving, the antenna outputs are connected via switch 107 to a receiver 205, and are mixed down in analog by RF receiver ("RX") modules 205 from the carrier frequency (for example around 1.9 GHz) to an FM intermediate frequency ("IF") of, for example, 384 kHz. This signal then is digitized (sampled) by analog to digital converters ("ADCs") 209 at, for example, 1.536 MHz. Only the real part of the signal is sampled. Thus, in complex phasor notation, the digital signal can be visualized as containing the complex valued IF signal at 384 kHz together with an image at −384 kHz. Final down-converting to baseband is carried out digitally by multiplying the 1.536 megasamples per second real-only signal by a 384 kHz complex phasor. The result is a complex valued signal that contains the complex valued baseband signal plus an image at, for example, −2×384=−768 kHz. This unwanted negative frequency image is filtered digitally to produce the complex valued baseband signal sampled at 1.536 MHz. GrayChip Inc. GC2011 digital filters can be used to implement the down-converting and the digital filtering, the latter using finite impulse response (FIR) filtering techniques. This is shown as block 213. The particular frequencies suggested above are provided by way of example. The invention can be adapted to suit a wide variety of RF and IF carrier frequencies and bands.

There are, in the present example, four down-converted outputs from each antenna's GC2011 digital filter device 213, one per receive timeslot. The particular number of timeslots can be varied to suit network needs. While the present example uses four uplink and four downlink timeslots for each TDD frame, desirable results have also been achieved with three timeslots for the uplink and downlink in each frame. For each of the four receive timeslots, the four down-converted outputs from the four antennas are fed to a digital signal processor (DSP) device 217 (hereinafter "timeslot processor") for further processing, including calibration, according to one aspect of this invention. Four Motorola DSP56303 DSPs can be used as timeslot processors, one per receive timeslot.

The timeslot processors 217 perform several functions including the following: received signal power monitoring; frequency offset estimation and time alignment; smart antenna processing including determining weights for each antenna element to determine a signal from a particular remote user; and demodulation of the determined signal.

The output of the timeslot processor 217 is demodulated burst data for each of the four receive timeslots. This data is sent to a host DSP processor 231 whose main function is to control all elements of the system and interface with the higher level processing, which is the processing which deals with what signals are required for communications in all the different control and service communication channels defined in the system's communication protocol. The host DSP 231 can be a Motorola DSP56303. In addition, timeslot processors send the determined receive weights to the host DSP 231. The main functions of the host DSP 231 specifically include:

maintaining state and timing information;

receiving uplink burst data from the timeslot processors 217;

programming the timeslot processors 217;

processing the uplink signals, including de-encrypting, de-scrambling, error correcting code checking, and burst deconstruction of the uplink;

formatting the uplink signal to be sent for higher level processing in other parts of the base station;

formatting service data and traffic data for further higher processing in the base station;

receiving downlink messages and traffic data from the other parts of the base station;

processing of downlink bursts (burst construction, encoding, scrambling and encryption);

formatting and sending downlink bursts to a transmit controller/modulator, shown as 237;

programming the transmit controller/modulator 237, including determining and sending transmit weight vectors to the transmit controller/modulator 237;

controlling the RF controller shown as 233; and maintaining and reporting modem status information, and controlling synchronization.

The RF controller 233 interfaces with the RF system, shown as block 245 and also produces a number of timing signals that are used by both the RF system and the modem. The specific tasks performed by the RF controller 233 include:

producing timing signals for the RF system (RX and TX) and other parts of the modem;

reading transmit power monitoring values;

writing transmit power control values;

producing the duplexer 107 switch box control signal; and reading automatic gain control (AGC) values.

the RF controller 233 receives timing parameters and other settings for each burst from the host DSP 231.

The transmit controller/modulator 237, receives transmit data from the host DSP 231, four symbols at a time. The transmit controller uses this data to produce analog IF outputs which are sent to the RF transmitter (TX) modules 245. The specific operations transmit controller/modulator 237 performs are:

converting data bits into a complex modulated signal;

up-converting to an IF frequency using, for example, a GrayChip 2011;

4-times over-sampling the IF signal;

multiplying this 4-times over-sampled complex signal by transmit weights obtained from host DSP 231; and converting the real part of the resulting complex valued waveforms via digital to analog converters ("DACs") which are part of transmit controller/modulator 237 to analog transmit waveforms which are sent to the transmit modules 245.

The transmit modules 245 up-convert the signals to the transmission frequency and amplify the signals. The amplified transmission signal outputs are sent to antennas 103 via the duplexer/time switch 107.

Remote Terminal

Figure 13:
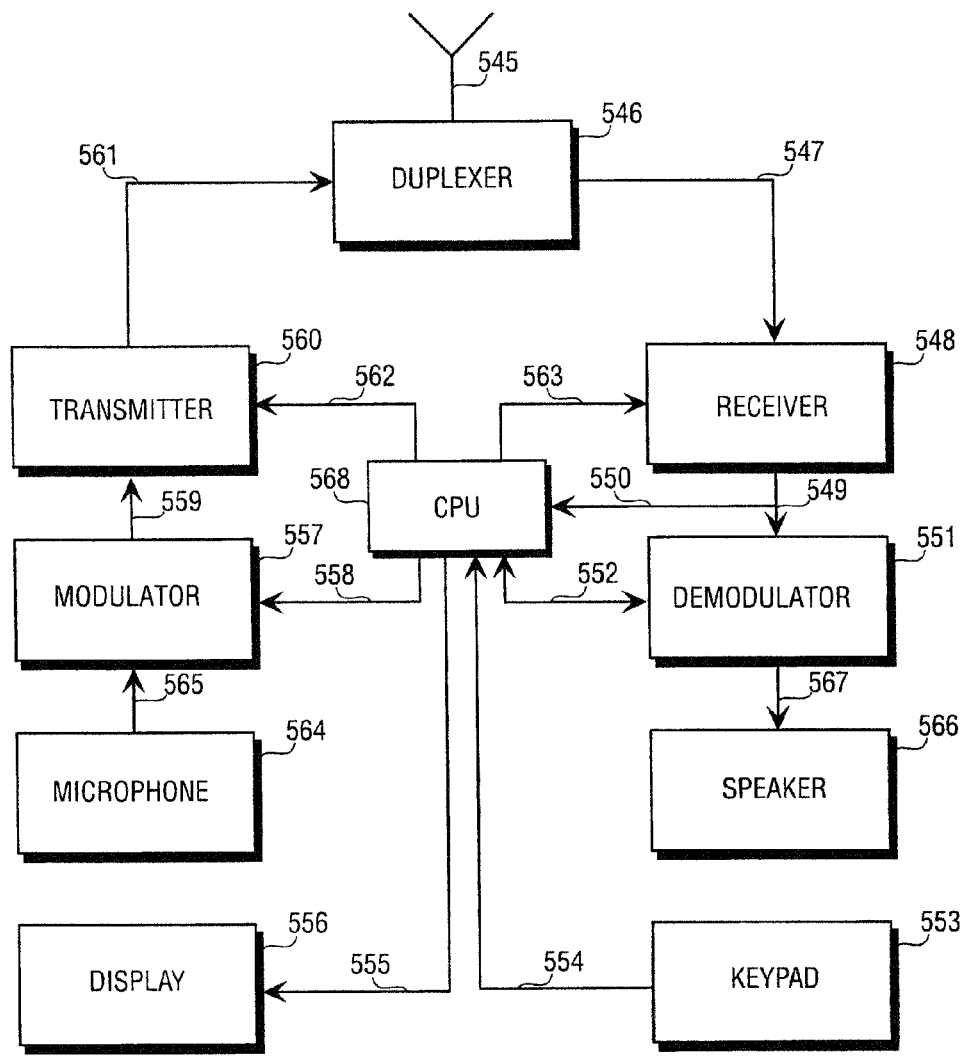
FIG. 13 is a block diagram of a remote terminal suitable for use with the present invention.

FIG. 13 depicts an example component arrangement in a remote terminal that provides data or voice communication. The remote terminal's antenna 545 is connected to a duplexer 546 to permit antenna 545 to be used for both transmission and reception. The antenna can be omni directional or for directional. For optimal performance, the antenna can be made up of multiple elements and employ spatial processing as discussed above for the base station. In an alternate embodiment, separate receive and transmit antennas are used eliminating the need for the duplexer 546. In another alternate embodiment where time division diversity is used, a transmit/receive (TR) switch can be used instead of a duplexer as is well-known in the art. The duplexer output 547 serves as input to a receiver 548. The receiver 548 produces a down-converted signal 549 which is the input to a demodulator 551. A demodulated received sound or voice signal 567 is input to a speaker 566.

The remote terminal has a corresponding transmit chain in which data or voice to be transmitted is modulated in a modulator 557. The modulated signal to be transmitted 559, output by the modulator 557, is up-converted and amplified by a transmitter 560, producing a transmitter output signal 561. The transmitter output 561 is then input to duplexer 546 for transmission by the antenna 545.

The demodulated received data 552 is supplied to a remote terminal central processing unit 568 (CPU) as is received data before demodulation 550. The remote terminal CPU 568 can be implemented with a standard DSP (digital signal processor) device such as a Motorola series 56300 DSP. This DSP can also perform the functions of the demodulator 551 and modulator 557. The remote terminal CPU 568 controls the receiver through line 563, the transmitter through line 562, the demodulator through line 552 and the modulator through line 558. It also communicates with a keyboard 553 through line 554 and a display 556 through line 555. A microphone 564 and speaker 566 are connected through the modulator 557 and demodulator 551 through lines 565 and 566, respectively for a voice communications remote terminal. In another embodiment, the microphone and speaker are also in direct communication with the CPU for voice or data communications remote terminals.

The remote terminal's voice signal to be transmitted 565 from microphone 564 is input to a modulator 557. Traffic and control data to be transmitted 558 is supplied by the remote terminal's CPU 568. Control data 558 is transmitted to base stations during registration, session initiation and termination as well as during the session as described in greater detail below.

In an alternate embodiment, the speaker 566, and microphone 564 are replaced or augmented by digital interfaces well-known in the art that allow data to be transmitted to and from an external data processing device (for example, a computer). In one embodiment the remote terminal's CPU is coupled to a standard digital interface such as a PCMCIA interface to an external computer and the display, keyboard, microphone and speaker are a part of the external computer. The remote terminal's CPU 568 communicates with these components through the digital interface and the external computer's controller. For data communications only, the microphone and speaker can be deleted. For voice only communications, the keyboard and display can be deleted.

Broadcast Channel (BCH)

Figure 14:
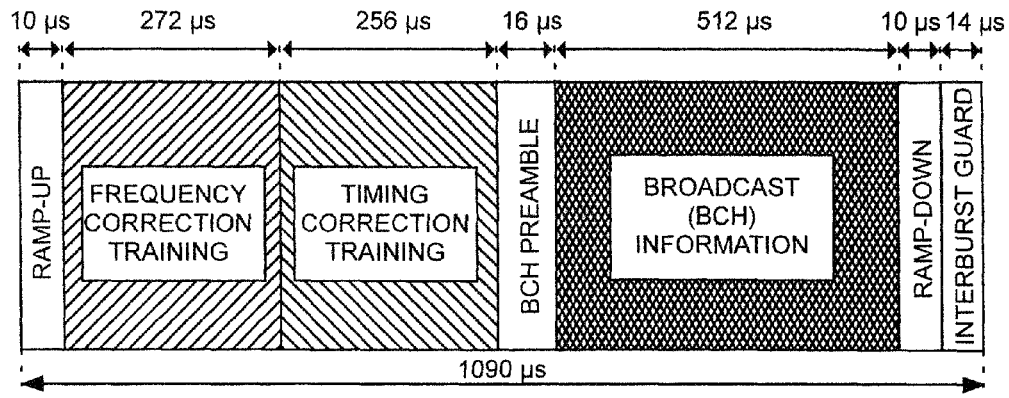
FIG. 14 is a diagram illustrating an example of a broadcast burst structure according to one embodiment of the present invention.

The system of the present invention is initiated for each user terminal or remote terminal from the broadcast channel BCH which is transmitted as a burst from the base station to all potential user terminals. The BCH burst, unlike the traffic channel bursts, is transmitted in all directions where user terminals may be, typically omnidirectionally but the specific beam pattern will depend on the network. Accordingly, the BCH burst will create more interference on the system than spatially directed or lower power traffic channels TCH. For this reason, the data and modulation properties of the BCH channel are selected to minimize interference. An example of a broadcast burst structure is shown in FIG. 14. Some of the important BCH burst properties are as follows. The BCH is computationally easy to find by scanning in real time having no knowledge of time-slot boundaries. It communicates enough basic information to enable a subsequent exchange of configuration request CR and configuration message CM between the base station and the user terminal. The BCH also provides good frequency offset and timing update information to all user terminals, even when the BCH is not specifically directed toward any one user terminal in particular.

Table 1, below summarizes the content of an example of a BCH burst, as shown in FIG. 14.

TABLE 1

| Duration | Contents |
|---|---|
| 10 μsec | ramp - up |
| 272 μsec | frequency correction training symbols $f_1, f_2, \ldots, f_{136}$ |
| 256 μsec | timing correction training symbols $t_1, t_2, \ldots t_{128}$ |
| 16 μsec | broadcast preamble $r_1, r_2, \ldots r_8$ |
| 512 μsec | information symbols $h'_1, h'_2, \ldots h'_{256}$ |
| 10 μsec | ramp - down |
| 14 μsec | inter-burst guard time |

The frequency and timing correction training symbols can be set according to any one of many approaches well-known in the art. They can also be combined, exchanged with a synchronization sequence or eliminated.

The broadcast information symbols are constructed from a 15-bit broadcast message which is modulated and coded into a 256 bit sequence. The number of symbols as well as the structure and sequence of transmitted bits can be varied to suit a wide variety of applications. The presently described embodiment has been selected in order to minimize the amount of information transmitted in the BCH as well as to minimize the bit rate. The broadcast channel information symbols provide the information needed for a user terminal to request a configuration message from the base station. They also provide information to guide user terminal handover decisions.

Each broadcast message is mapped into a broadcast burst with the information shown below in Table 2.

TABLE 2

Broadcast Message

| Field | # of Bits |
|---|---|
| BStxPwr | 5 |
| BSCC | 7 |
| BSload | 3 |
| Total | 15 |

BStxPwr is the effective isotropic radiated power of the broadcast message. This number indicates the power transmitted by the base station taking into account the number of amplifiers and diversity antennas available at the base station. For a typical system in which base stations have from one to ten antennas, the EIRP can be mapped into five bits using, for example, (2·BStxPwr+10) dBm.

BSCC is the base station color code, used by the user terminal to select training data for uplink bursts and to distinguish broadcasts of different base stations. In one embodiment, there are up to 128 different possible color codes. The color codes can be used to indicate a base station in a different location or a different modulator/demodulator set in the same location.

BSload is the load on the base station, used by the user terminal to determine how frequently to send random access messages. BSload is an indication of the amount of unused capacity the base station has. It can be different from the number of active registered subscribers because subscribers can require different amounts of traffic capacity. BSload represents the transmit and receive bit rates of each modem of the base station over a period of a few minutes measured against maximum possible loading.

In one embodiment, the BCH channel is shared by all base stations in the wireless communication system. Using the 7 bit BSCC, up to 128 base stations can be accommodated. The BCH is part of a time division duplex channel with a repeating frame. The channel that includes BCH is a single RF carrier frequency used for uplink and downlink. For high noise environments or for increased robustness, the BCH can hop frequencies according to a predetermined scheme or be repeated on several different frequencies. The repeating frame includes the downlink BCH for each base station, labeled BS1 etc. as shown in Table 3 below. The next frame includes the uplink Configuration Request CR, labeled CR1 etc. and downlink Configuration Message CM, labeled CM1 etc. Each frame also includes a number of reserved slots, shown as empty boxes below. These slots can be used for data traffic, if the broadcast channel is also used for traffic, for other control messages or reserved to reduce interference on other channels in the network. In one embodiment, the other traffic channels hop frequencies around and through the BCH. The frames are repeated for each respective base station 1 to 128 to build a superframe as discussed in more detail below. After the last CM, CM128, the superframe repeats and begins again with the next superframe and the BCH for base station 1.

TABLE 3

| | | Uplink | Downlink |
|---|---|---|---|
| Superframe 1 | Frame 1 | | BS1 |
| | Frame 2 | CR1 | CM1 |
| | Frame 3 | | BS2 |
| | Frame 4 | CR2 | CM2 |
| | ... | ... | ... |
| | Frame 255 | | BS128 |
| | Frame 256 | CR128 | CM128 |
| Superframe 2 | Frame 1 | | BS1 |
| | Frame 2 | CR1 | CM1 |
| | ... | ... | ... |

In another embodiment, the BCH is on its own channel and CR and CM are on a separate control channel. Alternately, one BCH can be provided on a constant frequency and a secondary BCH can be provided on another channel with hopping frequency. The hopping channel is described in the CM.

A base station can be considered a collection of base station modems serving a group of RF carriers. Alternatively, a base station can be an installation with a set of modems at a single site. For other system configurations each modem modulator/demodulator set 52, 62 can be considered a base station. Each base station is assigned a unique 32-bit base station identifier, BSID. The BSID is used to derive a base station color code which is defined in one embodiment as follows: BSCC=BSID mod 128. As a function of the BSCC, a base station frequency hops, broadcasts BCH, listens for uplink CR, and sends downlink CM in response to CR. Within a geographical region where radio transmissions overlap, the BSCC is uniquely assigned. No base station should be able to routinely see user terminals that are communicating with a base station of the same color code. Likewise, no user terminal should be able to see two base stations that are assigned the same BSCC. The total number of base stations as well as the number of frames in a superframe, the number of slots in a frame and the particular slots used for transmitting BCH bursts, CRs and CMs can be modified to suit particular applications.

To minimize, the data rate of BCH bursts still further, the BSCC and BSload can be removed from the BCH burst. The BCH burst then contains only training or synchronization and BStxPwr, the only information directly related to handover decisions. The user terminal can still distinguish and compare different base stations for selection and handover decisions based on timing of the received BCH bursts. The user terminal can also direct its CR message to a specific base station as shown in Table 3 based on timing. If there are only very few possible power levels for base stations in the system, for example two different transmit power level, then the two power levels can be distinguished by providing two different training sequences. This allows the BSTxPwr bits to be eliminated. For a single base station system, or if all base stations transmit with the same power, the BSTxPwr bits can also be deleted. If there is only one base station, it is not necessary to evaluate path loss but only whether the signal can be received. The rest of the network information can be learned upon registration, described below. Alternatively, since the BCH includes the BSCC, the user terminal can be programmed to read the BSCC and assume that BCH bursts with a common BSCC are from the same base station. In this way, the user terminal can learn a shortened frame repetition interval, and reduce the time needed to register with the system.

Registration

A user terminal forms a relationship with a base station called a registration. This registration begins by listening to the broadcast channel and ends with a handover, timeout, or disconnection. The first step of registration is accomplished by a remote by sending the Configuration Request burst CR and receiving a Configuration Message burst CM. The CM contains basic configuration parameters such as hopping sequence calculation parameters. Using the information from the CM, the user terminal then starts the process of opening an unauthenticated stream using a random access registration request RA-rreq. This unauthenticated stream carries only in-band signaling data used to complete registration and assignment of a registration identifier RID and paging identifier PID. Using the RID assigned at the end of the registration stream, the user terminal can open subsequent streams and it can end registrations. The user terminal can also open subsequent streams in which it can send packets which can be used for many purposes including to perform "network login" to an Internet Service Provider (ISP).

During the registration stream, identities and capabilities are exchanged, operating parameters are set, and a RID and PID are assigned. Later, a new network session may be created and attached to this RID, or an existing session may be handed over. This handover may be from another base station, another base station modem on the same base station (load shifting), or even from a hibernating session on the same base station modem. The specific details of registration are provided here as examples only. Many other registration scenarios are also possible within the scope of the present invention.

Base Station Selection

Referring to FIG. 17, the frame timing is established by the base stations that are in the area and transmitting on a pre-programmed RF carrier. It is preferred that the carrier be easy to find and be pre-programmed into the user terminals. The base stations, or base station if there is only one, employ GPS or some other precise common timing reference to establish the frame timing 300. GPS timing offers the advantage that it is accurately synchronized and inexpensively available to all base stations. This allows the BCH to be shared by all the base stations with only a minimal guard time in the BCH between base stations. Precise timing also allows the remote terminals to make distance-based comparisons of the base stations as will be described in more detail below. The base stations then build the BCH frame 302 described above and broadcast in their respective assigned slots 304.

When a user terminal turns on, it scans for BCH bursts on the well-known, optionally pre-programmed, RF carrier or carriers 306 to find basic frame timing alignment 308 and frequency synchronization 310. After timing and synchronization are established, the user terminal listens on the broadcast channel to the BCH bursts of all of the base stations that it can receive. A selection can be made by the user terminal after listening for one or more superframes on the broadcast channel. In one embodiment, in order to make the best selection, the user terminal will listen on the broadcast channel for five full superframes. This ensures that every BCH burst from every base station has been received several times and that accurate measurements can be made. For the user terminal to make more accurate measurements of received signal strength and timing delay, several samples of each BCH burst are used. The number of samples and therefore superframes depends on the conditions of the channel, the design of the receiver, the factors that are considered in a base station selection and other considerations. A specific number can be preset, determined ad hoc in each case or it may be varied as conditions change. Alternatively, if the user terminal requires a faster access time, it can listen only until the first adequate BCH burst is received and send a CR burst to that base station.

The user terminal scans the BCH carrier for BCH bursts, building a map of the base stations and the received statistics 312. From this base station map, the user terminal selects the most suitable base station 314. It also uses the BCH to precisely adjust its oscillator frequency and adjust its frame timing reference 308, 310. This is done using the frequency training and timing training sequences in the BCH burst, described above. Then, using its remote or user terminal ID (UTID) it builds 316 and sends 320 a Configuration Request CR, timed relative to the BCH burst for the selected base station. In one embodiment, the CR is scrambled using the BSCC that was received in the BCH from the selected base station 318.

An example of a base station map that a remote terminal can create based on the received BCH bursts is shown below as Table 4. In Table 4, the different base stations are listed and identified under BSCC. This information is received in each BCH burst. Alternatively, the BCH bursts can be listed in some sequential ordering and BSCC can be recorded as a separate column of values. The base station map contains any one or more of the following: BSCC, BSTxPwr, BSload, received signal strength, received signal delay, and quality measures of the received BCH bursts such as bit error rates (BER), signal to interference (SINR) and signal to noise ratios (SNR) etc. After the remoter terminal is registered with a base station the table can include an indication of the base station with which the remote is registered. In alternate embodiments, any one or more of the parameters shown in the table may be deleted and others may be added. In the example of Table 4, the values are summed to arrive at a suitability value. The base station with the lowest suitability value is selected for a registration attempt, i.e. a CR will be sent to the corresponding base station.

TABLE 4

| BSCC | BSTxPwr | BSload | RSSI | Delay | BER | SINR | Suitability |
|---|---|---|---|---|---|---|---|
| ... | ... | ... | ... | ... | ... | ... | ... |
| 17 | 29 | 6 | 2 | 20 | 5 | 10 | 72 |
| 18 | 0 | n/a | n/a | n/a | n/a | n/a | n/a |
| 19 | 15 | 5 | 5 | 18 | 2 | 9 | 54 |
| 20 | 25 | 7 | 20 | 29 | 10 | 12 | 103 |
| 21 | 5 | 4 | 8 | 5 | 9 | 12 | 43 |
| 22 | 0 | n/a | n/a | n/a | n/a | n/a | n/a |
| 23 | 0 | n/a | n/a | n/a | n/a | n/a | n/a |
| 24 | 17 | 2 | 12 | 12 | 7 | 8 | 58 |
| ... | ... | ... | ... | ... | ... | ... | ... |

In table 4, BSCC, BSTxPwr and BSload are received from each base station in the BCH burst as described above. BSCC allows the remote terminal to identify and track different base stations. If a base station broadcasts on several BCH frames, the different bursts can be associated. If a base station uses two different BSCCs for two different antenna or modem arrays then the distinction can be followed. Any type of identifiers other than a BSCC can be used depending on the network.

BSTxPwr has been discussed above. The remote terminal typically favors a lower power base station provided that the signal can be adequately received. As an alternative, if fewer parameters are measured and recorded in the base station map, the user terminal selects the base station with the highest power.

Another field in the BCH burst is BSload. This is an index of how much unused capacity is available at the base station. In one embodiment, a user terminal registers with a base station and then requests access whenever a session is desired. When the session is no longer desired, then it is ended until another request for access is sent. A base station that has very little unused capacity may not be able to grant access whenever it is needed. Accordingly, the user terminal will favor the base station with the largest amount of unused capacity. As an additional benefit, by providing the BSload field to the user terminals and allowing user terminals to select a base station with more capacity, network management and traffic allocation is improved, without a complex centralized traffic allocation center. In an alternate embodiment, BSload is not transmitted to the remote. When a base station determines that it is already too heavily loaded, it either fails to respond to a CR or it responds to CR with a CM that denies access to the base station.

Received signal strength (RSSI) is determined by the remote terminal for each BCH burst received from each base station using techniques well-known in the art. The value for RSSI can be taken as the burst's average dBm. In Table 4 a larger value for RSSI indicates a lower received signal strength level.

By using both the power with which the BCH burst was transmitted (BSTxPwr) and the power with which the BCH burst was received (RSSI), the base station map provides an indication of the power loss in the path between the base station and the user terminal. A burst with a high RSSI can be rejected if it began with a much higher BSTxPwr. On the other hand, a burst with a much lower RSSI and a much lower BSTxPwr indicates a clear, low loss channel and can be preferred. This criterion is taken into account in Table 4 when the values in each row are added together. As a result, low transmit power and high RSSI will yield the lowest suitability score.

Received signal delay is a measurement of the relative distance from each base station to the remote. The relative distance of the different base stations is determined by the user terminal comparing the BCH burst time offset of each BCH burst. In the superframe structure of Table 3, each base station sends its BCH burst at the same time in its respective assigned BCH slot. If the base stations are all synchronized to GPS or another timing reference, the delay measures the propagation time from each respective base station to the remote terminal. This time is directly proportional to the distance from the base station to the remote terminal. If the remote terminal is synchronized to the same common timing reference, then absolute distance can be determined. However, the relative distance is all that is required to make a base station selection.

Bit error rate (BER) is determined by the remote terminal for each BCH burst received from each base station using techniques well-known in the art. The value for BER can be taken as a scaled total number of bit errors in the each burst. In Table 4 a larger value for BER indicates a larger number of errors.

Other quality factors such as signal to interference, signal to noise, or any other suitable measurement can also be determined by the remote terminal for each BCH burst received from each base station using techniques well-known in the art. The value for the channel quality value is scaled for use in the map. In Table 4 a larger value for quality indicates a lower quality channel.

The final factor in the map (not shown in Table 4) is whether a base station is currently the one with which the user terminal is registered. The selection process herein can be used when a user terminal first enters a network but is also used periodically when the user terminal is already registered. This ensures that if the user terminal moves or channel conditions change or base station loading conditions change, the user terminal can make the best base station selection for the new circumstances. A base station that is nearly the best will remain the chosen base station so that unnecessary handovers are avoided and to provide some hysteresis to the overall communications system.

In one embodiment, thresholds are applied to at least some of the factors. A threshold can be applied to BSload. A base station with too much load i.e. too little reserve capacity will not be selected even if the other factors make it a strong candidate. Alternatively, in an asynchronous network in which registration may or may not be accompanied by the immediate exchange or data traffic, BSload can be used to discourage but not prevent the selection of the base stations with the least capacity.

A minimum threshold is applied to RSSI. If the RSSI from a base station is too low, then that base station will not be selected even if other factors make it a strong candidate. A threshold is applied to Distance. If the base station is too far away, then that base station will not be selected even if the other factors make it a strong candidate. This is done, in part to prevent an opportunistic reflection or other signal enhancer from forcing a selection of a much more distant base station. In one embodiment, remote terminals advance or delay the transmission of traffic channel and other bursts to equalize the propagation delay between different base stations. If a remote terminal advances its timing beyond a certain limit, then its bursts will interfere with bursts in the immediately preceding slot. As a result, the base station distance must be limited so that a remote's timing advance can be limited to an amount that will not cause this intereference. Other thresholds can also be applied. The particular choice of thresholds will vary depending on the design of the wireless communications system.

The user terminal can make a base station selection using any one or more of the factors above. The values in the map are constructed by taking the measurement or the bit sequence received in the BCH burst and scaling it by an appropriate amount. The particular scaling factor for each value will depend on the particular network. A statistical analysis is then performed to provide the optimal selection based on all factors. In the embodiment described above the values are added. In an alternate embodiment, thresholds are applied to rule out any very bad choices, the values for the remaining base stations are scaled and then added. The base station with the lowest score is selected. The lowest score base station will be the one with the best combination of high BSTxPwr, low BSload, high RSSI, low delay and the highest quality channel.

As mentioned above, the user terminal typically receives several transmissions of the BCH burst from each base station before a selection is made. The values and the measurements from each base station can be averaged before adding them to the base station map. Alternatively the highest or lowest values can be used or the most recently clearly received values can be used. In another embodiment, a derivative of the samples is taken for each base station and the base station with the highest positive slope is selected. In other words, the values of each base station are compared over time and the base station whose values are improving the fastest is selected.

Returning to FIG. 17, if the intended base station successfully receives the CR and has available capacity, it unscrambles the CR 322, and determines the spatial signature of the user terminal 324. The user terminal receives a Configuration Message burst CM in reply 326. The CM, described in greater detail below, contains sufficient information for the user terminal to learn its distance and RF path-loss to the base station, correct its timing advance, adjust its power control, and learn the parameters of frequency hopping (e.g. frame numbering and BSCC) 328. Several base stations may be probed with a CR to find the most responsive base station. Based on this information from the CM, the user terminal, when it has data to transmit, can start a session, beginning with a random access registration request RA-rreq 330. If resources are available, the base station sends an Access Assignment AA 332 to the user terminal assigning a traffic channel. The base station and user terminal exchange various access control parameters including encryption keys on this established stream. Finally a RID and PID are assigned. Using this RID, the user terminal can establish secure streams (e.g. RA-rts/AA-cts) in which it transmits and receives internet or any other types of data or voice packets 334.

The traffic channel includes a data acknowledgement DA or a data invalid DI response to each transmitted data packet. The DA and DI messages are transmitted as a part of the next data packet from the recipient in the next slot. In a time division duplex frame, the base station and the user terminal alternate slots 336, 338, 340, 342, as shown in FIG. 17. Accordingly, if any slots are not received properly, the data can quickly be retransmitted. This reduces the size of the data buffers at the respective base station and user terminal modems. As shown in Tables 3 and 4, uplink slots always precede downlink slots and there is a guard time between the two in order to allow for any synchronization errors or unanticipated propagation delays. In one embodiment, each side transmits data packets in three slots, each slot including ramp-up and ramp-down periods as well as synchronization bits as is well-known in the art.

TABLE 5

| 1 2 3 | | 1 2 3 | | 1 2 3 ... |
|---|---|---|---|---|
| Uplink Slots | Guard Time | Downlink Slots | Guard Time | Uplink Slots |

Periodically, the user terminal scans the BCH to update its base station map. A user terminal can vary the frequency of these scans depending on its mobility, the quality of the existing channel and other factors. The scanning can be limited to those BCH bursts which are the best or near best based on the measurements in the existing map. Those BCH bursts that improve with each successive superframe can be sampled more frequently than those which are worse or do not change.

In one embodiment, when a particular base station is determined to be a better choice than the existing one, the user terminal will attempt registration by sending a CR burst at the appropriate time scrambled with the BSCC of the selected base station. It the base station responds with a CM burst, then registration proceeds as described above, after which the user terminal has two active registrations. When the user terminal desires a network session, it can select the base station which is the best at that time or select only the base station with which it is more recently registered. Any other registration can be cancelled through a network controller, by request of the user terminal or after a time-out with the old base station.

When it detects a better base station, the user terminal may send a CR to this new base station and possibly handover its network session. It may however, not receive a CM burst in reply or registration may fail for another reason. If successful stream initiation fails too many times, the user terminal enters a timeout state. From timeout, it may try to regain a RID via RA-rreq, refresh its timing advance using a CR, find a new base station to which it might handover by scanning the BCH, or even begin from scratch to re-acquire basic frame timing. If this re-establishment is successful, the user terminal may be able to continue its network session by completing a network session handover to the new base station.

Channel Considerations

In one embodiment, the network is designed to take maximal advantage of spatial division multiple access technologies and particularly smart antenna array signal processing. To help maintain reliable spatial channels in an extremely dense frequency reuse pattern, the network uses time division duplex TDMA where uplink and downlink transmissions are always on the same frequency. In addition, because many user terminals are single antenna and transmit and receive omni-directionally, except for the BCH, an uplink burst is always received before a downlink burst needs to be sent. This allows downlink bursts to be more accurately spatially directed. An uplink training sequence is embedded in every uplink burst to allow for moderately fast frequency hopping despite any decorrelation of the spatial channel with frequency.

The frequency hopping sequence may be any one of many different sequences well-known in the art. The parameters of the frequency hopping scheme are initially unknown to the user terminal. This maximizes the flexibility of the network and increases the flexibility of the user terminal. As explained below, the frequency hopping parameters are transmitted to the user in the CM burst.

Configuration Request CR

Figure 15:
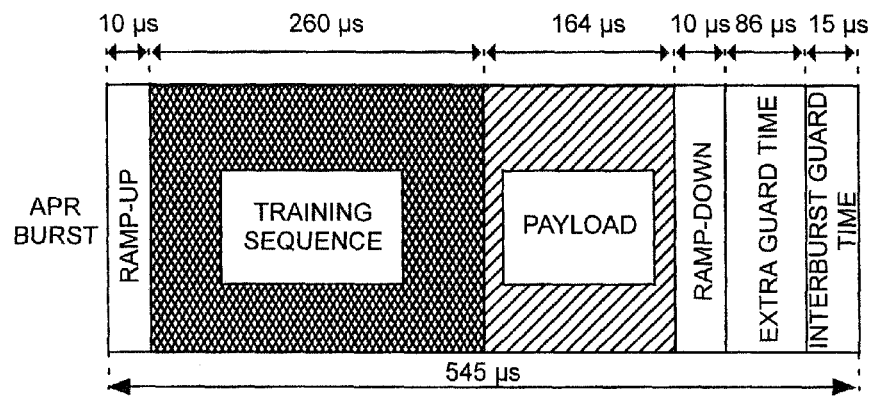
FIG. 15 is a diagram illustrating an example of a Configuration Request burst structure according to one embodiment of the present invention.

An example of a Configuration Request burst structure is shown in FIG. 15. CR bursts are distinguished from random access RA and traffic TCH bursts, in part, by a special CR spatial training sequence. The CR training sequence is longer than normal and has periodic properties that make finding timing alignment especially computationally efficient. The CR burst is transmitted from a user terminal at an unknown distance from the base station. Because of time-of-flight considerations, the user terminal time base is delayed relative to the base station. Furthermore, its CR transmission is also delayed because its timing advance is not yet initialized. Shortening the CR burst by 86 μsec allows it to arrive up to 86 μsec late without spilling over into the next time-slot. These 86 μsec mean that a user terminal 10 kilometers from the base station can send a CR burst that will land completely within its time-slot. If this burst is seen by the base station, and replied to, the corresponding CM will contain a timing advance adjustment which will properly position subsequent data bursts.

Table 6 below summarizes the content of the example CR burst as shown in FIG. 15. The 82 information symbols are constructed from the configuration request message using modulation and coding.

TABLE 6

| Duration | Contents |
| --- | --- |
| 10 μsec | ramp-up |
| 260 μsec | training symbols $a_1, a_2, \ldots, a_{130}$ |
| 164 μsec | information symbols $h_1, h_2, \ldots, h_{82}$ |
| 10 μsec | ramp-down |
| 86 μsec | extra guard time |
| 15 μsec | inter-burst guard time |

CR spatial training is the same for all base stations and the base station does not necessarily know the location of the user terminal before receiving the CR. CRs are transmitted by user terminals at a fixed offset from BCH transmissions as shown in Table 3. The resulting time-multiplexed registration channel easily distinguishes CRs sent to different ones of several nearby base stations. Furthermore, CR and CM are scrambled by a function of BSCC ensuring that even if there is some interference from CRs sent to nearby base stations, the demodulation capture effect of the BSCC works out any collisions. In one embodiment, the scrambling is performed by taking the encoded bit sequence and exclusive OR'ing it with the output of a linear feedback shift register. Finally the smart antenna spatial resolution ability of the base station is applied to resolve any remaining ambiguities in received CRs.

A configuration request message is mapped onto a configuration request burst CR by the physical layer. A configuration message is mapped onto a standard downlink burst by the physical layer. The information symbols of the present CR burst are mapped out as shown in Table 7, below. Any of the items listed below can be deleted and transmitted later during the registration cycle or not at all based on the needs of the system.

TABLE 7

Configuration Request Message

| Field | # of Bits |
| --- | --- |
| identity | 8 |
| utClass | 4 |
| txPwr | 5 |
| Total | 17 | identity is a set of unique random bits for each user terminal that differentiate simultaneous messages from multiple user terminals. Because of the randomness and large number of bits, it is unlikely that two user terminals will select the same identity code at the same time.

utClass identifies user terminal capabilities (highest modulation class, frequency hopping capabilities, etc.) This sequence identifies the type of user terminal that sent the CR. A palmtop digital assistant might have different capabilities than a desktop computer with a fixed dedicated antenna. With utClass, the different capabilities can be distinguished.

txPwr represents the power used by the user terminal to transmit the Configuration Request burst. For example, user terminal power=(2·txPwr−30) dBm.

CR is sent on the control carrier, as an example, exactly 2265 μsec after receipt of a downlink BCH burst. In this way, an otherwise uninitialized user terminal can send CR without any knowledge of the frequency hopping sequence parameters. The CR burst is shorter than a standard uplink time-slot to allow for unknown time-of-flight from the user terminal to the base station and typically arrives late in the uplink time-slot receive window.

Configuration Message CM

Figure 16:
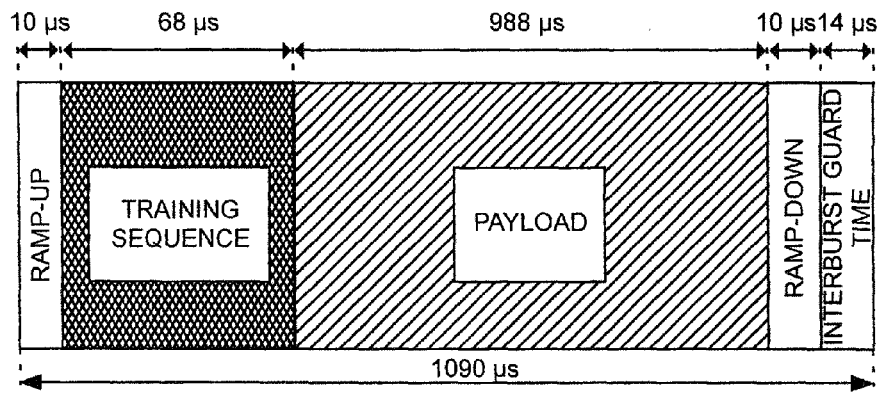
FIG. 16 is a diagram illustrating an example of a Configuration Message burst structure according to one embodiment of the present invention.

Table 8 below summarizes the content of an example Configuration Message burst as shown in FIG. 16. The 494 information symbols are constructed from the configuration message using modulation and coding.

TABLE 8

| Duration | Contents |
| --- | --- |
| 10 μsec | ramp-up |
| 68 μsec | training symbols $a_1, a_2, \ldots, a_{130}$ |
| 988 μsec | information symbols $h_1, h_2, \ldots, h_{494}$ |
| 10 μsec | ramp-down |
| 15 μsec | inter-burst guard time |

The configuration message CM burst is sent on the BCH carrier, exactly 5 msec after sending a downlink BCH burst, whenever CR was received on the corresponding uplink time-slot. Using this timing, CM is directed to the requesting user terminal. CM is also sent in a spatially directed signal based on the analysis of the spatial signature, for example parameters, such as DOA and TOA of the uplink CR. Since CM is sent on the BCH carrier, a fixed time offset from BCH, an otherwise uninitialized user terminal can receive CM without any knowledge of the frequency hopping sequence parameters. CM, in response to CR, includes, among other things; the AFN (Absolute Frame Number), a larger timing-advance adjustment dynamic range, coarser power control, and various access control parameters. Table 9, below summarizes the content of the CM burst as shown in FIG. 16. Any of the items listed below can be deleted and transmitted later during the registration cycle or not at all based on the needs of the system.

TABLE 9

Configuration Message

| Field | # of Bits |
| --- | --- |
| identity | 8 |
| pwrCtrl | 4 |
| timingAdjust | 7 |
| AFN | 10 |
| carrierMask | 16 |
| racarrierMask | 16 |
| raslotMask | 3 |
| raDec | 3 |
| hopping | 1 |
| Total | 70 |

The meanings of the symbol sets are as follows:

identity: the random identity sent by the user terminal in the CR pwrCtrl: power offset that the user terminal should apply to future parameter request bursts and random access bursts: offset=(2·pwrCtrl−16) dB.

timingAdjust: timing advance that the user terminal should apply to future random access bursts: timing advance=timingAdjust μs.

AFN: the 10 least significant bits of the Absolute Frame Number carrierMask: bitmap of carriers containing traffic channels racarrierMask: bitmap of carriers containing random access channels (least significant bit is carrier 0)

raslotMask: bitmap of slots containing random access channels (least significant bit is slot 1). Random access channels occur where both racarrierMask and raslotMask are non-zero.

raDec: AFNs available for random access channels.

hopping: if equal to 1, the relationship between physical and logical carriers hops each frame.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps. The steps of the present invention may be performed by hardware components, such as those shown in FIGS. 9 to 12, or may be embodied in machine-executable instructions, which may be used to cause a general-purpose or special-purpose processor or logic circuits programmed with the instructions to perform the steps. Alternatively, the steps may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

In the foregoing detailed description, the method and apparatus of the present invention has been described with reference to specific exemplary embodiments thereof. It will, however, be evident that various modifications and changes may be made thereto without departing from the broader spirit and scope of the present invention. In particular, the separate blocks of the various block diagrams represent functional blocks of methods or apparatuses and are not necessarily indicative of physical or logical separations or of an order of operation inherent in the spirit and scope of the present invention. For example, the various blocks of FIG. 1A may be integrated into components, or may be subdivided into components, and, the blocks of FIG. 2 represent portions of a method which, in some embodiments, may be reordered or may be organized in parallel rather than in a linear or stepwise fashion. The present specification and figures are accordingly to be regarded as illustrative rather than restrictive.

What is claimed is:

1. A method of operating a base station comprising:
receiving a random access request for a traffic channel of a plurality of traffic channels on a first random traffic channel of the plurality of traffic channels, the first random traffic channel not designated as a random access channel, the traffic channels to be selectively allocatable by the base station for communication with a user terminal;

determining whether a traffic channel of the plurality of traffic channels is available to allocate to the requestor based on an evaluation of factors, including evaluating a status of a subscriber from whom the request originates including subscription terms of the subscriber; and communicating to the requestor whether a traffic channel of the plurality of traffic channels is available.

2. The method of claim 1 wherein:
communicating includes denying the request for a channel.

3. The method of claim 1 wherein:
communicating includes granting the request for a channel by assigning the first channel.

4. The method of claim 1 wherein:
communicating includes granting the request for a channel by assigning a second channel and the first channel.

5. The method of claim 1 wherein:
communicating includes granting the request for a channel by assigning a second channel instead of the first channel.

6. The method of claim 1 wherein:
determining includes evaluating a load of the system.

7. The method of claim 1 wherein:
determining includes evaluating an emergency status of the request.

8. The method of claim 1 wherein:
evaluating the subscription terms of the subscriber includes evaluating a guaranteed probability of access in connecting specified in the subscription terms.

9. The method of claim 1 wherein:
evaluating the status includes evaluating the payment history of the subscriber.

10. The method of claim 1 wherein:
determining includes evaluating a nature of the request.

11. The method of claim 10 wherein:
the nature of the request includes a high bandwidth requirement.

12. The method of claim 10 wherein:
the nature of the request includes a low bandwidth requirement.

13. The method of claim 10 wherein:
the nature of the request includes a set of capabilities of equipment used to make the request.

14. The method of claim 3 further comprising:
receiving a request for a third channel of the plurality of channels upon assigning of the first channel;
determining whether a third or fourth channel of the plurality of channels is available; and
communicating to the requestor the third channel availability or fourth channel availability.

15. A method of operating a user terminal comprising:
sending a request for a first unallocated traffic channel of a plurality of traffic channels on the first unallocated traffic channel to access a network, the request including a subscriber identification; and
receiving an indication of availability of a traffic channel of the plurality of traffic channels, the indication of availability based on an evaluation of factors, including evaluating a status of the subscriber of the user terminal including subscription terms of the subscriber.

16. The method of claim 15 wherein:
the request including an emergency code.

17. The method of claim 15 wherein:
the request including an equipment identification.

18. The method of claim 15 wherein:
the request including a training sequence.

19. The method of claim 15 wherein:
the indication signaling no channel is available.
20. The method of claim 15 wherein:
the indication signaling the first channel is available.
21. The method of claim 15 wherein:
the indication signaling a second channel of the plurality of channels is available.
22. The method of claim 21 wherein:
the indication signaling the first channel is also available.
23. The method of claim 20 further comprising:
communicating using the first channel.
24. The method of claim 21 further comprising:
communicating using the second channel.
25. The method of claim 22 further comprising:
communicating using the first channel and the second channel.
26. The method of claim 23 further comprising:
sending a request for a third channel of the plurality of channels; and
Receiving an indication of availability of a channel of the plurality of channels.
27. The method of claim 26 wherein:
the indication signaling the third channel is not available.
28. The method of claim 26 wherein:
the indication signaling the third channel is available.
29. The method of claim 26 wherein:
the indication signaling a fourth channel is available.
30. The method of claim 19 further comprising:
waiting an inter-channel delay;
sending a request for a third channel of the plurality of channels on the third channel;
receiving an indication of availability of a channel of the plurality of channels.
31. The method of claim 30 wherein:
the indication signaling the third channel is not available;
determining no other channels may be requested;
waiting an inter-attempt delay; and
sending a request for the first channel on the first channel.
32. The method of claim 1 wherein:
evaluating the status includes evaluating the usage history of the subscriber.
33. The method of claim 1 wherein:
determining includes evaluating the radio frequency characteristics of the request.
34. A non-transitory machine-readable medium embodying instructions, the instructions, when executed by a processor, causing the processor to perform a method, the method comprising:
receiving a random access request for a traffic channel of a plurality of traffic channels on a first random traffic channel of the plurality of traffic channels, the first random traffic channel not designated as a random access channel, the traffic channels to be selectively allocatable by the base station for communication with a user terminal;
determining whether a traffic channel of the plurality of traffic channels is available to allocate to the requestor based on an evaluation of factors, including evaluating a status of a subscriber from whom the request originates including subscription terms of the subscriber; and
communicating to the requestor whether a traffic channel of the plurality of traffic channels is available.
35. The machine-readable medium of claim 34 further embodying instructions, the instructions, when executed by a processor, causing the processor to perform a method, wherein:
communicating includes denying the request for a channel.
36. The machine-readable medium of claim 34 further embodying instructions, the instructions, when executed by a processor, causing the processor to perform a method, wherein:
communicating includes granting the request for a channel by assigning the first channel.
37. The machine-readable medium of claim 34 further embodying instructions, the instructions, when executed by a processor, causing the processor to perform a method, wherein:
communicating includes granting the request for a channel by assigning a second channel and the first channel.
38. The machine-readable medium of claim 34 further embodying instructions, the instructions, when executed by a processor, causing the processor to perform a method, wherein:
communicating includes granting the request for a channel by assigning a second channel instead of the first channel.
39. The machine-readable medium of claim 34 further embodying instructions, the instructions, when executed by a processor, causing the processor to perform a method, wherein:
determining includes evaluating a load of the system.
40. The machine-readable medium of claim 34 further embodying instructions, the instructions, when executed by a processor, causing the processor to perform a method, wherein:
determining includes evaluating an emergency status of the request.
41. The machine-readable medium of claim 34 further embodying instructions, the instructions, when executed by a processor, causing the processor to perform a method, wherein:
evaluating the subscription terms of the subscriber includes evaluating a guaranteed probability of access in connecting specified in the subscription terms.
42. The machine-readable medium of claim 34 further embodying instructions, the instructions, when executed by a processor, causing the processor to perform a method, wherein:
evaluating the status includes evaluating the payment history of the subscriber.
43. The machine-readable medium of claim 34 further embodying instructions, the instructions, when executed by a processor, causing the processor to perform a method, wherein:
determining includes evaluating a nature of the request.
44. The machine-readable medium of claim 43 further embodying instructions, the instructions, when executed by a processor, causing the processor to perform a method, wherein:
the nature of the request includes a high bandwidth requirement.
45. The machine-readable medium of claim 34 further embodying instructions, the instructions, when executed by a processor, causing the processor to perform a method, wherein:
the nature of the request includes a low bandwidth requirement.
46. The machine-readable medium of claim 43 further embodying instructions, the instructions, when executed by a processor, causing the processor to perform a method, wherein:
the nature of the request includes a set of capabilities of equipment used to make the request.

47. The machine-readable medium of claim 36 further embodying instructions, the instructions, when executed by a processor, causing the processor to perform a method, wherein:
receiving a request for a third channel of the plurality of channels upon assigning of the first channel;
determining whether a third or fourth channel of the plurality of channels is available; and
communicating to the requestor the third channel availability or fourth channel availability.

48. The machine-readable medium of claim 34 further embodying instructions, the instructions, when executed by a processor, causing the processor to perform a method, wherein:
evaluating the status includes evaluating the usage history of the subscriber.

49. The machine-readable medium of claim 34 further embodying instructions, the instructions, when executed by a processor, causing the processor to perform a method, wherein:
determining includes evaluating the radio frequency characteristics of the request.

50. The machine-readable medium of claim 34 further embodying instructions, the instructions, when executed by a processor, causing the processor to perform a method, wherein:
communicating includes at least one of: denying the request for a channel, granting the request for a channel by assigning the first channel, granting the request for a channel by assigning a second channel and the first channel, or granting the request for a channel by assigning a second channel instead of the first channel.

51. The machine-readable medium of claim 34 further embodying instructions, the instructions, when executed by a processor, causing the processor to perform a method, wherein:
determining includes at least one of: evaluating the radio frequency characteristics of the request, evaluating a load of the system, evaluating an emergency status of the request, evaluating a status of a subscriber from whom the request originates, or evaluating a nature of the request.

52. The method of claim 1, further comprising calculating a set of spatial multiplexing weights and a set of spatial demultiplexing weights associated with the request.

53. The method of claim 1, wherein communicating to the requestor includes using the set of spatial multiplexing weights to tailor a multi-lobe antenna radiation pattern.

54. The machine-readable medium of claim 34 further embodying instructions, the instructions, when executed by a processor, causing the processor to perform a method, further comprising:
calculating a set of spatial multiplexing weights and a set of spatial demultiplexing weights associated with the request.

55. The machine-readable medium of claim 34 further embodying instructions, the instructions, when executed by a processor, causing the processor to perform a method, wherein:
communicating to the requestor includes using the set of spatial multiplexing weights to tailor a multi-lobe antenna radiation pattern.

* * * * *